United States Patent
Wang et al.

(10) Patent No.: US 10,521,265 B2
(45) Date of Patent: Dec. 31, 2019

(54) COALESCING PERIODIC TIMER EXPIRATION IN GUEST OPERATING SYSTEMS IN A VIRTUALIZED ENVIRONMENT

(75) Inventors: Haiyong Wang, Redmond, WA (US); Brandon S. Baker, Redmond, WA (US); Shuvabrata Ganguly, Seattle, WA (US); Thomas D. I. Fahrig, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 1514 days.

(21) Appl. No.: 12/234,353

(22) Filed: Sep. 19, 2008

(65) Prior Publication Data
US 2010/0077394 A1     Mar. 25, 2010

(51) Int. Cl.
*G06F 9/48*     (2006.01)
*G06F 9/455*     (2018.01)

(52) U.S. Cl.
CPC ........ *G06F 9/4812* (2013.01); *G06F 9/45533* (2013.01); *Y02D 10/24* (2018.01); *Y02D 10/26* (2018.01); *Y02D 10/28* (2018.01)

(58) Field of Classification Search
CPC ............ Y02D 10/24–28; G06F 9/4812; G06F 9/45533–52
USPC .......................................................... 718/1
See application file for complete search history.

(56) References Cited

U.S. PATENT DOCUMENTS

| | | | |
|---|---|---|---|
| 5,758,137 A * | 5/1998 | Armstrong et al. | 713/502 |
| 7,103,745 B2 | 9/2006 | Koning et al. | 711/173 |
| 7,386,749 B2 | 6/2008 | Rifani et al. | 713/400 |
| 7,475,002 B1 * | 1/2009 | Mann | 703/23 |
| 2002/0184288 A1 * | 12/2002 | Vargas et al. | 709/100 |
| 2003/0101440 A1 | 5/2003 | Hardin et al. | 717/148 |
| 2003/0153368 A1 * | 8/2003 | Bussan et al. | 455/574 |
| 2004/0236875 A1 * | 11/2004 | Jinzaki | 710/15 |
| 2006/0020842 A1 * | 1/2006 | Olsen et al. | 713/502 |
| 2006/0075402 A1 | 4/2006 | Neiger et al. | 718/1 |
| 2006/0225073 A1 | 10/2006 | Akagawa et al. | 718/1 |
| 2006/0288349 A1 | 12/2006 | Zimmer et al. | 718/107 |
| 2007/0033589 A1 | 2/2007 | Nicholas | 718/1 |
| 2008/0028411 A1 | 1/2008 | Cherkasova et al. | 718/104 |
| 2008/0062957 A1 * | 3/2008 | Narasimha et al. | 370/350 |
| 2008/0147946 A1 * | 6/2008 | Pesavento et al. | 710/265 |
| 2009/0140844 A1 * | 6/2009 | Roychowdhury | 340/309.16 |
| 2009/0307519 A1 * | 12/2009 | Hyatt | G06F 1/3203 713/502 |

OTHER PUBLICATIONS

Integrated Real-Time Systems Vibhooti Verma Mtech stage III report, Indian Institute of Technology, Bombay Published: 2007.*

(Continued)

*Primary Examiner* — Emerson C Puente
*Assistant Examiner* — Paul V Mills
(74) *Attorney, Agent, or Firm* — BakerHostetler

(57) ABSTRACT

Techniques are disclosed for coalescing timer ticks generated by timers used to service guest operating systems executing in virtual machines. By coalescing timer ticks a logical processor can enter a low power mode thereby reducing power consumed by the system.

18 Claims, 16 Drawing Sheets

(56) References Cited

OTHER PUBLICATIONS

Integrated Real-Time Systems (continued), document retrieved on Dec. 22, 2011 from: http://www.it.iitb.ac.in/~erts/car/documents/reports/vibhooti-stage3.pdf Referring page with document title accessed on Dec. 22, 2011 http://www.it.iitb.ac.in/~erts/index.php?page=documents.*
Windows Timer Coalescing Microsoft Corp. Jan. 20, 2009.*
[Patch] Deferrable Timer Ke Yu et al. Xen development thread and associated responses. Published: Initial post—Jul. 17, 2008; responses—None later than Jul. 22, 2008.*
A Separation Model for Virtual Machine Monitors Nancy L. Kelem and Richard J. Feiertag p. 78 Published: 1991.*
VGreen: A System for Energy-Efficient Management of Virtual Machines Gaurav Dhiman, Giacomo Marchetti, and Tajana Rosing p. 6: 1 and 6: 5 Published: 2010.*
Using Kinect for Windows with a Virtual Machine Publisher: Microsoft p. 1; Retrieved from: http://msdn.microsoft.com/en-us/library/jj663795.aspx Published: No later than Jun. 23, 2014.*
An Evaluation of KVM for Use in Cloud Computing M. Fenn, M. A. Murphy, J. Martin, and S. Goasguen p. 1-2 Published: 2008.*
Ada for Software Engineers M. Ben-Ari p. 1-2; 249-250 Published: 2005.*
What is a Virtual Machine? Publisher: what-is-what.com Retrieved from: http://what-is-what.com/what_is/virtual_machine.html Published: no later than Jun. 23, 2014.*
What is Virtualization author identified as "kegior" Retrieved from: http://virtuaplanet.blogspot.com/2011/09/what-is-virtualization.html Published Sep. 2, 2011.*
Timer.h; time.h; timer.c; time.c Rolf Neugebauer, K A Fraser Xen hypervisor source code Published: 2005.*
Achieving High Resolution Timer Events in Virtualized Environment Blazej Adamczyk, Andrzej Chydzinski Jul. 2015.*
Xen Project Mailing List Screen Captures Collection of web page captures from relating to the Xen Developer mailing list Published: None later than Nov. 22, 2016.*
Soft Timers: Efficient Microsecond Software Timer Support for Network Processing Mohit Aron and Peter Druschel (Year: 2000).*
General-Purpose Timing: The Failure of Periodic Timers Dan Tsafrir Yoav Etsion Dror G. Feitelson (Year: 2005).*
"I/O Device Serialization and Virtualization," http://support.microsoft.com/kb/68975, downloaded 2008, 4 pages.
Brady, J.F., "Virtualization and CPU Wait Times in a Linux Guest Environment," http://www.perfdynamics.com/Classes/Materials/BradyVirtual.pdf, downloaded 2008, 6 pages.
"Proceedings of the Linux Symposium," http://ols.108.redhat.com/2007/Reprints/siddha-Reprint.pdf, 2007, 10 pages.
Aron et al., "Soft Timers: Efficient Microsecond Software Timer Support for Network Processing," http://www.cs.rice.edu/CS/Systems/Soft-timers/soft-timers-tocs.pdf, 2000, 18(3), p. 197-228.

* cited by examiner

COALESCING PERIODIC TIMER EXPIRATION IN GUEST OPERATING SYSTEMS IN A VIRTUALIZED ENVIRONMENT

BACKGROUND

Hardware virtualization allows for multiple machines to execute as separate virtual machines running on a single physical machine. Generally, operating systems require a periodic interrupt source, referred to as timer ticks, to drive their internal clocks and these timer ticks generate interrupts that are handled by a processor. When there are more virtual machines executing on a computer the number of interrupts that need to be generated linearly increases. The emergent behavior is that the processor will be interrupted more often an have less opportunities to enter a low power mode. Accordingly, techniques for allowing a processor to remain in an idle mode for a longer period of time while still providing timer ticks are desirable.

SUMMARY

An example embodiment of the present disclosure describes a method. In this example, the method includes, but is not limited to receiving, by a first virtual timer of a first virtual machine, a request for interrupts from a first guest operating system executing on the first virtual machine; determining a system time for scheduling the interrupt for the first virtual machine, the system time for scheduling the interrupt based on an amount of system time to delay scheduling the interrupt; and storing an interrupt request for the first virtual machine, the interrupt request associated with the determined system time for scheduling the interrupt for the first virtual machine. In addition to the foregoing, other aspects are described in the claims, drawings, and text forming a part of the present disclosure.

An example embodiment of the present disclosure describes a method. In this example, the method includes, but is not limited to receiving a signal from a guest operating system executing on a virtual machine, the signal programming a virtual timer of the virtual machine to generate periodic interrupts; determining, from the programmed virtual timer, an interrupt frequency for the virtual machine; determining, from the interrupt frequency, a system time that is a multiple of the interrupt frequency; and storing a pending interrupt in memory, the pending interrupt associated with the system time that is the multiple of the interrupt frequency. In addition to the foregoing, other aspects are described in the claims, drawings, and text forming a part of the present disclosure.

An example embodiment of the present disclosure describes a method. In this example, the method includes, but is not limited to receiving an interrupt; determining that a current system time is within an interrupt time range, the interrupt time range associated with at least two virtual machines, each virtual machine associated with a virtual processor; and sending virtual processor interrupts to the at least two virtual processors. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
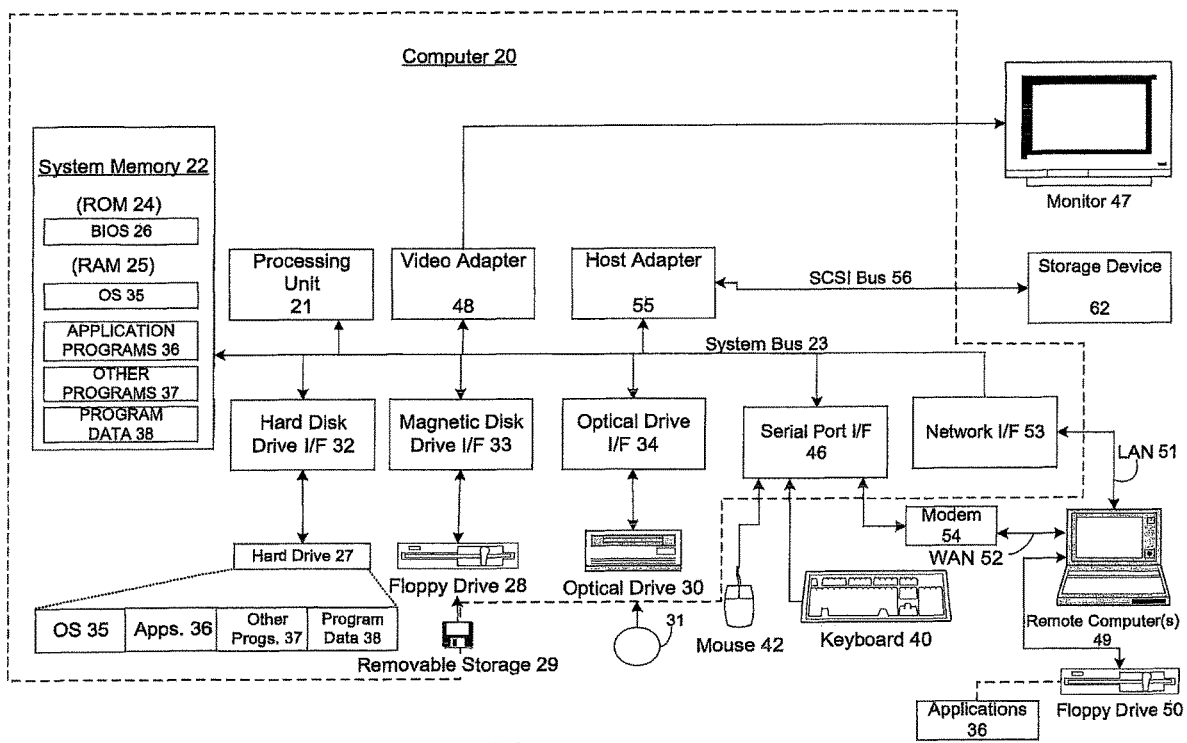
FIG. 1 depicts an example computer system wherein aspects of the present disclosure can be implemented.

Embodiments of the present disclosure may execute on one or more computers. FIG. 1 and the following discussion is intended to provide a brief general description of a suitable computing environment in which the disclosure may be implemented. One skilled in the art can appreciate that some or all of the components of the computer system of FIG. 1 can be used to effectuate computer 200 of FIG. 2.

The term circuitry used through the disclosure can include specialized hardware components such as hardware interrupt controllers, graphics processors, and audio codecs for example. In the same or other embodiments circuitry can include microprocessors configured to perform function(s) by firmware or by set switches. In the same or other example embodiments circuitry can include one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be processed by the logical processor. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Referring now to FIG. 1, an exemplary general purpose computing system is depicted. The general purpose computing system can include a conventional computer 20 or the like, including a general purpose processing unit 21 that can include one or more logical processors, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments computer executable instructions embodying aspects of the present disclosure may be stored in ROM 24, hard disk (not shown), RAM 25, removable magnetic disk 29, optical disk 31, and/or a cache of general purpose processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the general purpose processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
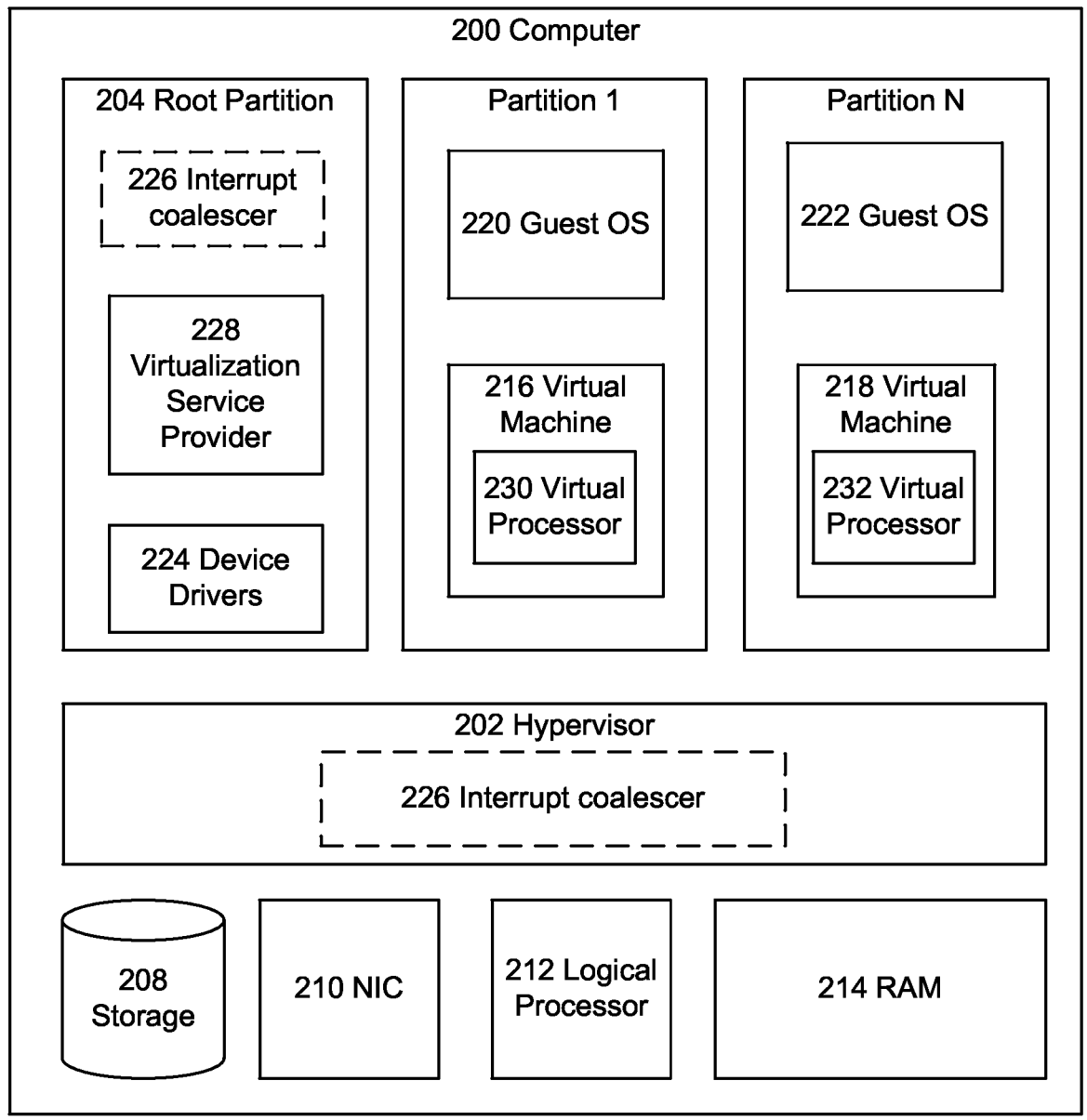
FIG. 2 depicts an operational environment for practicing aspects of the present disclosure.
Figure 3:
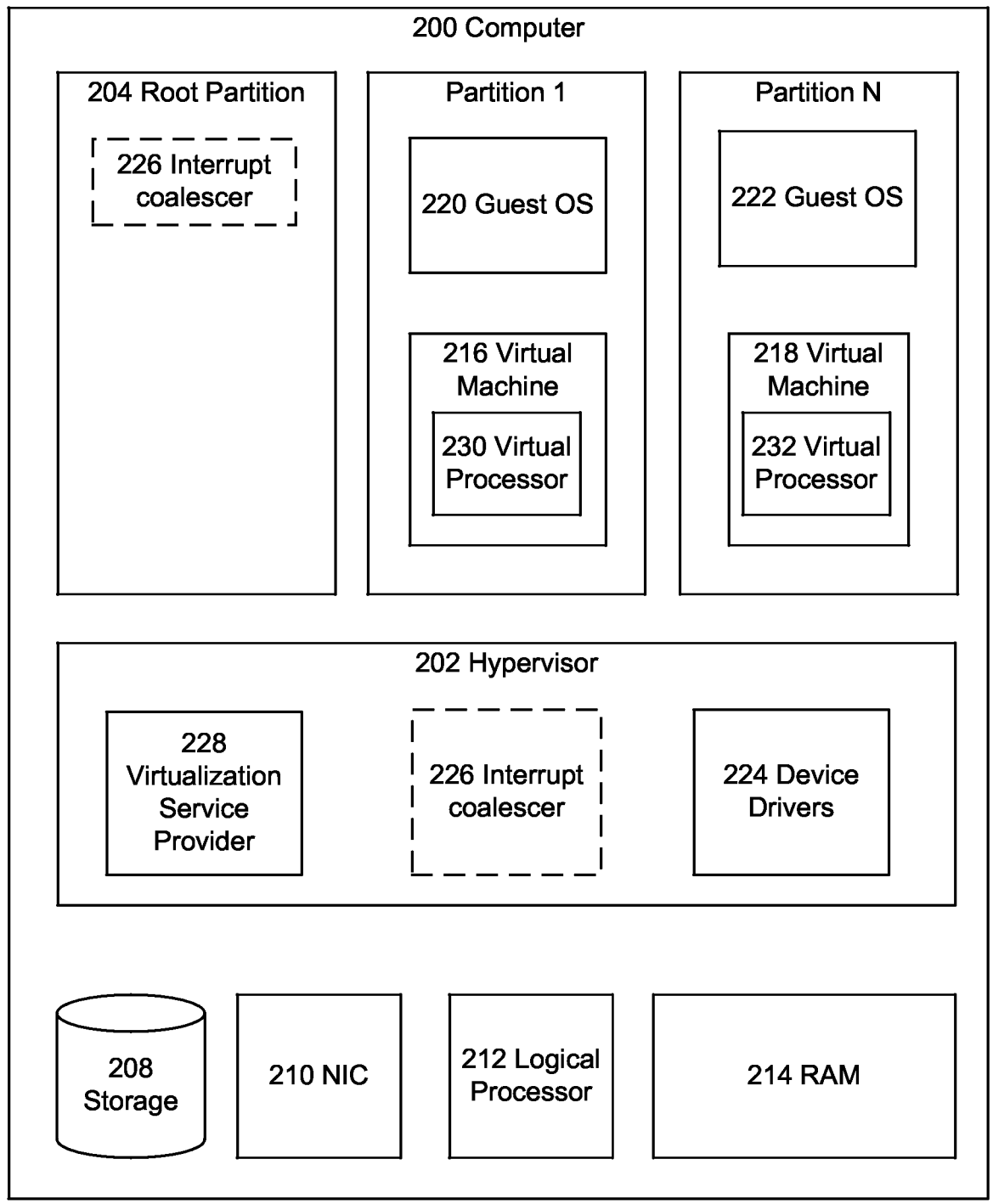
FIG. 3 depicts an operational environment for practicing aspects of the present disclosure.

Referring now to FIGS. 2 and 3, they depict high level overviews of computer systems including circuitry for virtualizing resources that can be used in aspects of the present disclosure. As shown by the figure, computer 200 can include physical hardware devices such as storage 208, e.g., a hard drive, a network interface controller (NIC), e.g., a network interface card or Ethernet adapter, at least one logical processor 212 and random access memory (RAM) 214. One skilled in the art can appreciate that while one logical processor is illustrated in other embodiments the computer 200 may have multiple logical processors, e.g., multiple execution cores and/or multiple processors. In these embodiments multiple threads can be executed at the same time, e.g., one thread per logical processor. Continuing with the description of FIG. 2, depicted is a hypervisor 202 that may also be referred to as a virtual machine monitor. The hypervisor 202 in the depicted embodiment includes executable instructions for controlling and arbitrating access to the hardware of computer 200 however in other embodiments the hypervisor 202 can be embedded within firmware of the motherboard or a portion of the hypervisor 202 can be effectuated by specialized integrated circuits. Continuing with the description, the hypervisor 202 can generate execution environments called partitions such as partition 1 and partition N (where N is an integer greater than 1.) In embodiments of the present disclosure a partition can be considered the basic unit of isolation supported by the hypervisor 202, that is, each partition can be mapped to a set of hardware resources, e.g., memory, devices, logical processor cycles, etc., that is under control of the hypervisor 202.

Continuing with the description of FIG. 2, the computer 200 can include a root partition 204 that may include a virtualization service provider 228 (VSP.) In this example architecture the root partition 204 can access the underlying hardware via device drivers 224. The VSP 228 in this example can effectuate interfaces in the children partitions that can be considered virtual machines by instantiating different classes of devices as software and exposes interfaces to the devices within the partitions. Each virtual machine such as VM 216 and 218 can include a virtual processor such as virtual processors 230 and 232 that the guest operating system can manage and schedule threads to execute on. Generally, the virtual processors 230 and 232 are executable instructions that provide a representation of a physical processor with a specific architecture. For example, one virtual machine may have a virtual processor having characteristics of an Intel 80X86 processor, whereas another virtual processor may have the characteristics of a Power PC processor. The virtual processors in this example can be mapped to logical cores of the computer system 200 such that the instructions that effectuate the virtual processors are backed by logical processors. Thus, in these example embodiments multiple virtual processors can be simultaneously executing while, for example, another logical processor may be executing hypervisor instructions.

Continuing with the description of FIG. 2, it additionally illustrates an interrupt coalescer 226. The interrupt coalescer 226 can include computer executable instructions that can configure a logical processor to generate interrupts for guest operating systems in a more efficient manner in order to allow the logical processor to enter a low power state. As is illustrated by the dashed lines of FIG. 2, the coalescer 226 can be code within the computer executable code that effectuates the hypervisor 202 or in other embodiments the coalescer 226 can be part of the code that effectuates the root partition 204. The coalescer 226 can in other embodiments be a stand alone piece of code, e.g., the coalescer 226 does not have to be part of the hypervisor 202 or the root partition 204 and the disclosure is not limited to the depicted embodiments. For example, the coalescer 226 can be stored in ROM and attached to the motherboard. In another embodiment, the coalescer 226 can be a standalone piece of customized hardware.

Referring now to FIG. 3, it illustrates an alternative architecture that can be used to practice embodiments of the present disclosure. FIG. 3 depicts similar components to those of FIG. 2, however in this example embodiment the hypervisor 202 can include the virtualization service provider 228 and device drivers 224. In this architecture the hypervisor 202 can perform the same or similar functions as the hypervisor 202 of FIG. 2. In this example the hypervisor 202 can be thought of as instructions that executes directly on the bare metal of the hardware. In this example the root partition 204 may have instructions that can be used to configure the hypervisor 204 however hardware access requests may be handled by the hypervisor 202 instead of being passed to the root partition 204. Similar to that above, the coalescer 226 can be included within the instructions that effectuate the hypervisor 202, the instructions that effectuate the root partition 204, any other place within the computer system 200, or by hardware.

The following are a series of flowcharts depicting implementations of processes. For ease of understanding, the flowcharts are organized such that the initial flowcharts present implementations via an overall "big picture" viewpoint and subsequent flowcharts provide further additions and/or details. Those having skill in the art will appreciate that the style of presentation utilized herein generally allows for a rapid and easy understanding of the various operational procedures that form a part of the present disclosure.

Figure 4:
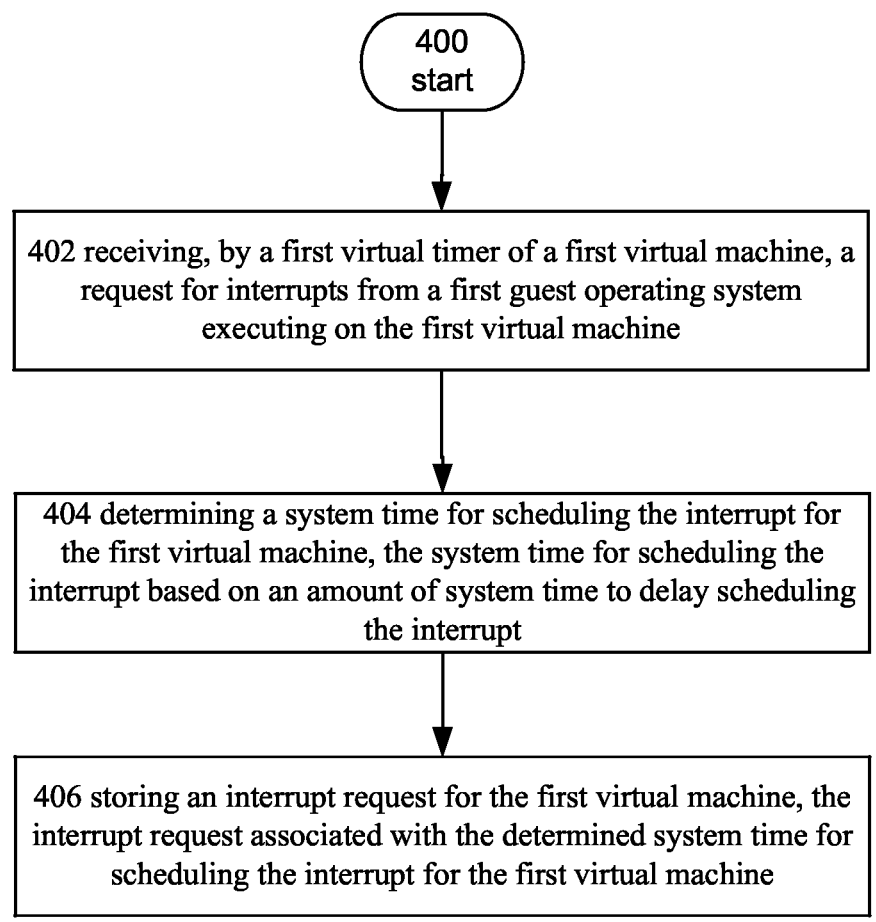
FIG. 4 illustrates an operational procedure for coalescing interrupts.

Referring now to FIG. 4, it illustrates an example process for practicing aspects of the present disclosure including operations 400-406. As is illustrated by FIG. 4, operation 400 begins the operational procedure and operation 402 shows receiving, by a first virtual timer of a first virtual machine, a request for interrupts from a first guest operating system executing on the first virtual machine. Generally, operating systems such as Widows Vista from Microsoft, certain versions of Linux, OS 10 from Apple, or a legacy operating system, e.g., Widows Millennium, require periodic timer ticks in order to update their internal clocks, e.g., clocks that keep audio and video synchronized, and/or determine whether various requests have timed out, for example a virtual NIC that is waiting for a response may use the interrupt to determine whether to time out the request. The mechanism that provides these ticks is a timer that can be an integrated circuit operatively coupled to the motherboard or in other instances it can be a component of the processor. When the timer expires the logical processor coupled to the timer is interrupted and the processor loads an interrupt handler in order to update the operating system clocks. In a virtualized environment both the guest operating systems and virtualized hardware may use the periodic interrupts to set their states correctly, thus the periodic timer signals still need to be delivered to the guest operating systems.

In order to supply a virtual timer the root 204 can expose an interface for the virtual timer to the guest operating system. In a specific instance the virtual timer can include a set of instructions that when executed by a logical processor 212 the processor 212 emulates a physical timer such as a Real time clock (RTC) or the advanced programmable interrupt controller (APIC) that is a programmable interrupt controller that is included with the x86 processor architecture. In other embodiments other timers can be emulated such as a programmable interrupt controller (PIC), or any other hardware component that can provide a periodic interrupt source that can be found in a computer system.

The virtual timer, e.g., a PIT or a RTC of virtual processor 232 can be set by the guest operating system 222, e.g., the guest can configure the virtual timer to provide a periodic interrupt. In this example the guest operating system 222 can set the virtualized registers of any timer in a manner that is indicative of programming it to provide a periodic interrupt. More specifically, a logical processor 212 can execute instructions that emulate an RTC having registers and the guest operating system 222 can program the virtual RTC to generate a periodic interrupt. After the virtual timer is programmed the logical processor 212 can execute the coalescer 226 and the processor 212 can receive a signal that indicates that the virtual timer has been set. In another example embodiment the guest operating system 222 can be enlightened, that is the guest operating system is executing in a mode that is optimized for executing on a virtual machine. In this example the virtualized RTC may not have virtual registers that can be set and may just include an interface that is operable to receive a signal indicative of a request for an interrupt and the request can be stored in memory.

As shown by FIG. 4, once the request for interrupts is received, operation 404 can be performed that illustrates determining a system time for scheduling the interrupt for the first virtual machine, the system time for scheduling the interrupt based on an amount of system time to delay scheduling the interrupt. In an embodiment the logical processor 212 can execute the instructions that effectuate the coalescer 226 and determine an amount of system time to delay scheduling the interrupt, thereby relaxing the expiration time to an expiration window. The system time in an embodiment is controlled by an internal clock that can increment over time at, for example, nanosecond intervals. Generally speaking, this system clock can be part of internal architecture of the logical processor 212 and can be effectuated by a series of registers. Generally, the physical timer is programmed to expirer based on the system time and the interrupt interval associated with virtual timer request, that is, if the virtual timer is programmed at system time 1 ms and has an interrupt frequency of 15 ms, the hypervisor 202 would program the physical timer to expire at system time equals to 16 ms. However in embodiments of the present disclosure the coalescer 226 can delay setting the physical timer an amount of time that makes scheduling the interrupt more efficient for the logical processor 212 to service. For example, in order to allow the logical processor 212 to enter a lower power mode for perhaps a millisecond each interrupt can be delayed an amount of time in order to group the interrupt requests. Thus, once the interrupt requests are grouped one physical interrupt can be used to generate multiple virtual processor interrupts.

In this example embodiment an appropriate time to delay the interrupt can be calculated that takes into consideration the tolerance of the guest operating system requesting the interrupt, e.g., a lack of timer precision will affect execution of the guest operating system, and a desire to reduce the amount of interrupts the logical processor 212 has to generate. If for example, another virtual machine, for example virtual machine 216 is scheduled to receive an interrupt within the tolerance range of the guest operating system 222 the coalescer 226 can determine a system time for scheduling the interrupt that is the same as the pending interrupt from virtual machine 216. In this example the interrupt used for virtual machine 216 can be used to also service virtual machine 218 thereby reducing the number of interrupts and potentially allowing the logical processor to enter a lower power execution mode. In a specific embodiment a request for an interrupt can be received at system time equal to 5 ms. The coalescer 226 can be executed by the logical processor 212 and the logical processor 212 can determine that another interrupt is scheduled to expire at system time equal to 7 ms. In this example the logical processor 212 can delay scheduling the interrupt until system time equal to 7 ms so that it is serviced along with the other interrupt.

Continuing with the example, operation 406 shows storing an interrupt request for the first virtual machine, the interrupt request associated with the determined system time for scheduling the interrupt for the first virtual machine. Once a system time is determined for the interrupt, an interrupt request can be stored in a memory location along with the scheduled interrupt time. When for example, the logical processor 212 executes the coalescer instructions the logical processor 212 can check the current system time and determine whether any interrupt requests in the memory need to be serviced. In an example embodiment where the coalescer 226 is part of the hypervisor 202, the instructions that effectuate the hypervisor 202 can be registered to handle interrupts and the coalescer 226 can be executed when the logical processor 212 enters the hypervisor 202. That is, when the logical processor 212 enters hypervisor execution mode, e.g., a hypercall is made, a hypervisor interrupt occurs, or a hardware interrupt occurs from an asynchronous event, the coalescer instructions can be processed and the stored interrupt requests can be checked. In an alternative embodiment, one in which the coalescer 226 is part of the root partition 204 or stand alone instructions stored firmware, the instructions that effectuate the hypervisor 202 can be executed by the logical processor 212 when an interrupt occurs and the hypervisor 202 can direct the logical processor 212 to execute the coalescer 226. The coalescer 226 instructions can be processed and the logical processor 212 can check the stored interrupt requests to determine whether any interrupt need to be serviced.

Figure 5:
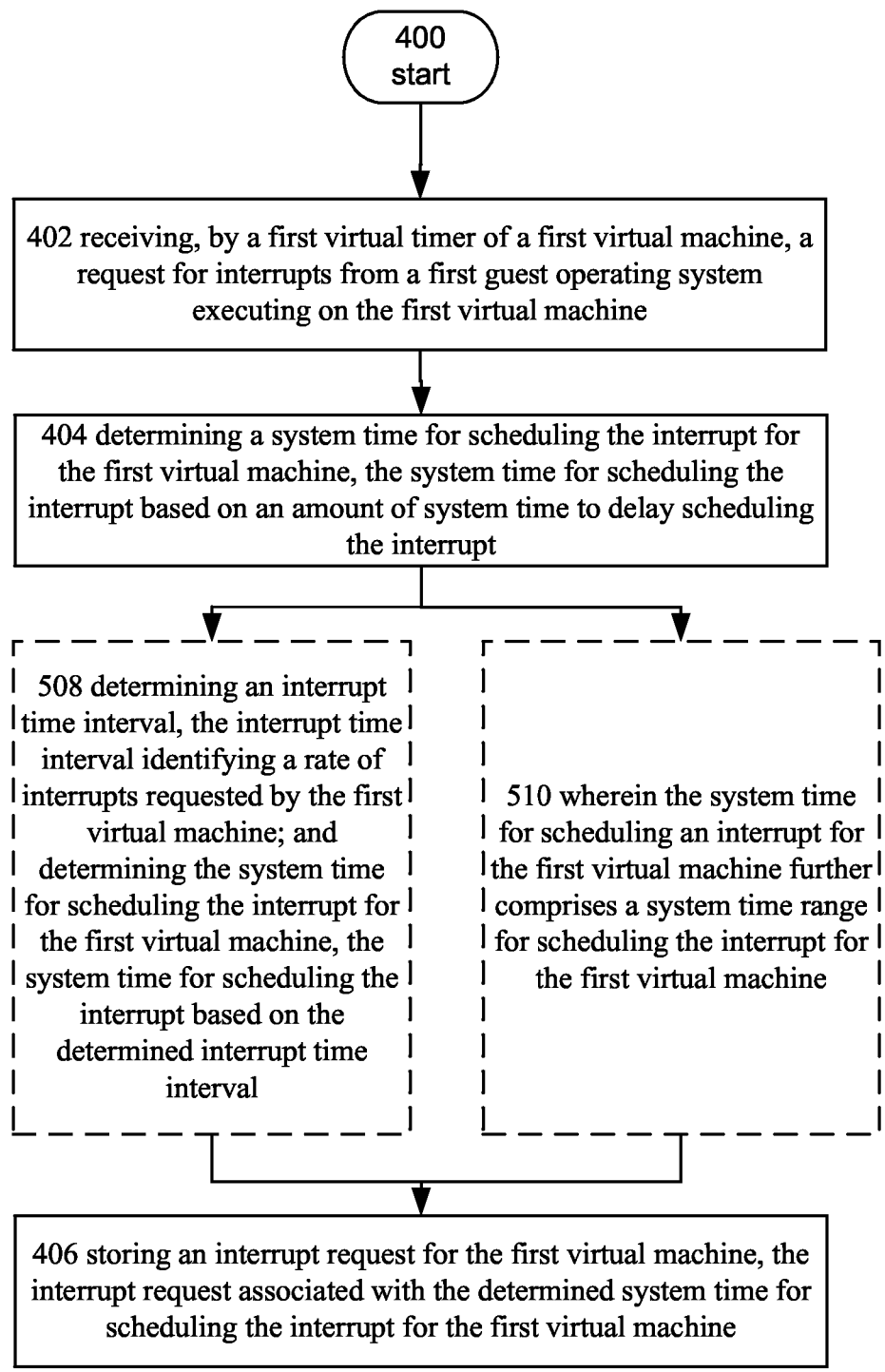
FIG. 5 illustrates an alternative embodiment of the operational procedure 400 of FIG. 4.

Referring now to FIG. 5, it illustrates an alternative embodiment of the operational procedure 400 of FIG. 4 including the additional operations 508 and 510. Referring to operation 508, it shows determining an interrupt time interval, the interrupt time interval identifying a rate of interrupts requested by the first virtual machine; and determining the system time for scheduling the interrupt for the first virtual machine, the system time for scheduling the interrupt based on the determined interrupt time interval. For example, in an example embodiment a logical processor 212 can execute the coalescer 226 and can determine a frequency of interrupts from the request received from the virtual machine 218. In an embodiment the logical processor 212 configured by the coalescer instructions 226 can determine an interrupt interval from the information stored in the virtual timer of the virtual machine 218. For example, the instructions that emulate the timer can include instructions that emulate registers that can be set by the guest operating system 222 to set a periodic interrupt. In this example the instructions that effectuate the interrupt coalescer 226 can be executed and the logical processor 212 can determine the frequency of interrupts from the information stored in the virtual timer. For example, a guest operating system such as Windows Vista may set the registers of the virtual timer to generate 64 interrupts per second. In this example the logical processor 212 can execute the coalescer 226 and determine that the guest operating system is requesting an interrupt every 15.6 ms. In another example embodiment the guest operating system may be enlightened and may send a signal indicative of a request for 64 interrupts per second to the virtual timer and the coalescer 226 can be configured to determine that the guest operating system is requesting an interrupt every 15.6 ms. In yet another embodiment the guest operating system may request an interrupt every 15.6 ms and the coalescer 226 can determine that the guest operating system is requesting an interrupt every 15.6 ms by accessing the timer memory.

In this example the interrupt frequency can be used to determine a system time for scheduling an interrupt for the first virtual machine. The interrupt frequency can be used in the alternative, or in addition to the amount of system time to delay scheduling an interrupt. For example, in an embodiment the where the interrupt frequency is used the processor 212 can determine an appropriate time to schedule a first interrupt that is the next instance of the interrupt period. For example, if a interrupt request is processed at system time equal to 5 ms and has a period of 10 ms. The processor 212 can schedule the interrupt to occur at system time 10 ms. The logical processor 212 in this example may then schedule subsequent interrupts at intervals of the interrupt frequency, e.g., at system time 20 ms, 30 ms, 40 ms, etc.

Continuing with the description of FIG. 5, operation 510 illustrates the operational procedure of FIG. 4, wherein the system time for scheduling an interrupt for the first virtual machine further comprises a system time range for scheduling the interrupt for the first virtual machine. For example, in an embodiment of the present disclosure the scheduled time can comprise a system time range for scheduling the interrupt. In this example embodiment the instructions that effectuate the coalescer 226 can be executed by the logical processor 212 and the logical processor 212 can determine a range of system times where an interrupt can be generated for virtual machine 218. In this example embodiment the range of system time values can include a range that is large enough to be used to generate interrupts for at least one more additional guest operating system while generating an interrupt within the tolerance level needed to keep the operating systems executing correctly. For example, if two virtual machines 216 and 218 are being executed, the logical processor 212 can calculate, for each virtual machine, a range of system times bounded by the minimum system time where an interrupt can occur and the maximum system time where an interrupt can occur, where the minimum and maximum are time values within the tolerances of the guest operating system. The processor 212 can then be configured by the coalescer instructions to determine the intersection between the time ranges for each virtual machine. In a specific example a range of interrupts for a first virtual machine may be calculated to be time values [8:16] and a second virtual machine may be calculated to be [10:20]. In this example the intersection would be [10:16] and the intersection can be used to program a timer to generate an interrupt within the intersection. In this example one physical interrupt can be used to service virtual machines that have different interrupt intervals and/or have been scheduled at different times.

Figure 6:
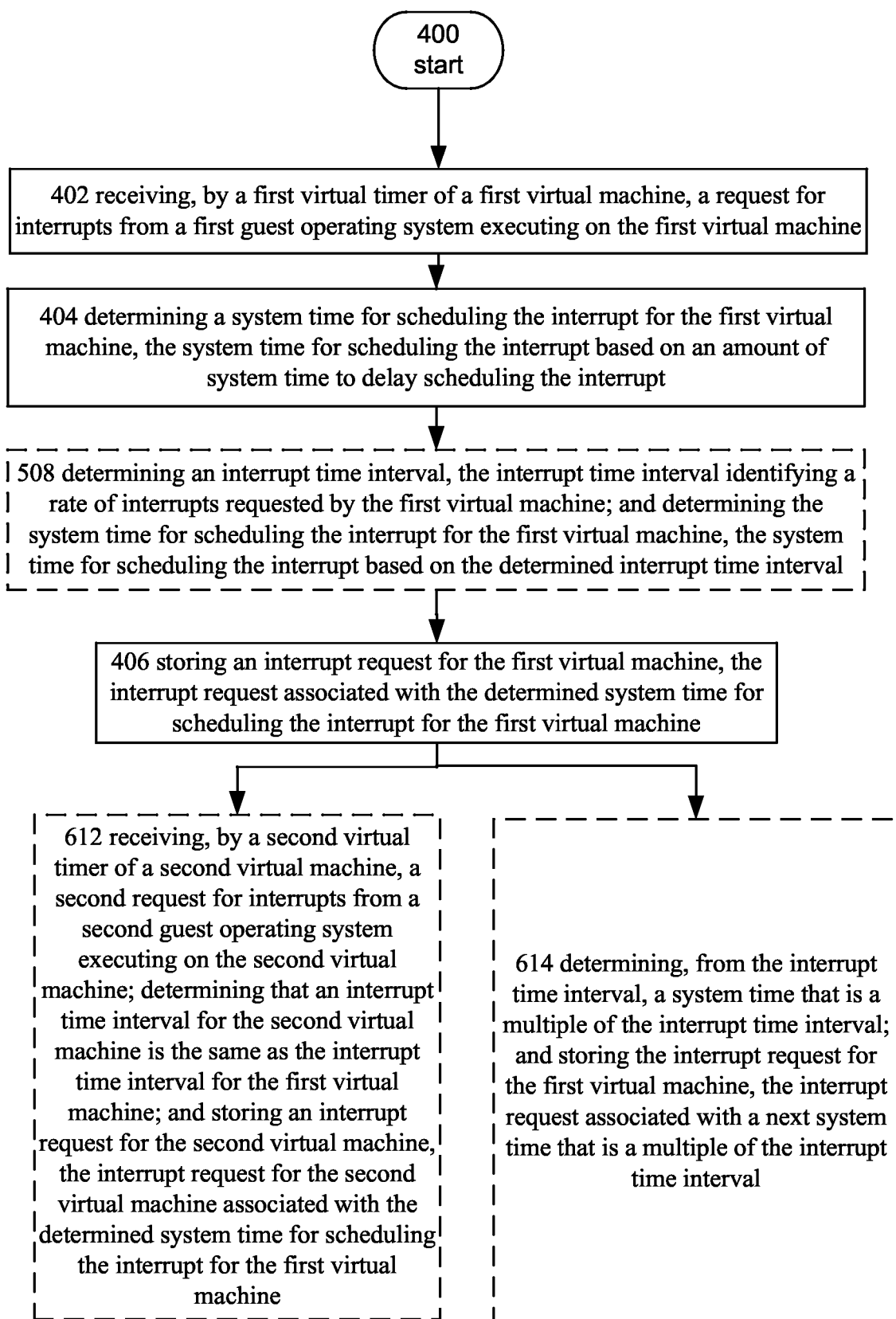
FIG. 6 illustrates an alternative embodiment of the operational procedure of FIG. 5.

Referring now to FIG. 6, it illustrates an alternative embodiment of the operational procedure of FIG. 5 including the additional operational procedures 612 and 614. Referring now to operation 612 shows receiving, by a second virtual timer of a second virtual machine, a second request for interrupts from a second guest operating system executing on the second virtual machine; determining that an interrupt time interval for the second virtual machine is the same as the interrupt time interval for the first virtual machine; and storing an interrupt request for the second virtual machine, the interrupt request for the second virtual machine associated with the determined system time for scheduling the interrupt for the first virtual machine. For example, in an example embodiment a virtual machine such as virtual machine 216 can also have a virtual timer such as a virtualized RTC a PIT, or any other timer. Guest operating system 220 can in this example set the virtualized registers of the timer in a manner that is indicative of programming the timer to provide a periodic interrupt. The logical processor 212 can execute the coalescer 226 and can determine the frequency of interrupts from the information stored in the virtual timer. In this example the logical processor 212 can execute the coalescer 226 and check the pending interrupts to determine whether any other pending interrupts have a similar interrupt frequency. In this specific example the logical processor 212 can determine that the interrupt frequency set by virtual machine 216 is the same as the interrupt frequency set by virtual machine 218. The logical processor 212 in this example can determine the system time currently scheduled to expire the pending interrupt for virtual machine 218 and store an interrupt request for virtual machine 216 that expires at the same time as the interrupt for virtual machine 216.

In a specific example, virtual machine 218 may set a virtualized timer at time equals 3 and the virtualized timer may be set to generate interrupts every 10 ms. Virtual machine 216 may set a virtualized timer at time equals 6 to generate interrupts every 10 ms. The logical processor 212 can execute the instructions that effectuate the coalescer 226 and delay the first interrupt request until, for example, time equals 10 ms and store an interrupt request associated with 10 ms system time. In addition, the logical processor 212 can schedule subsequent interrupts to expire at system time equal to 20 ms and 30 ms for example. The logical processor 212 can then determine that the frequency of interrupts set by the second guest operating system 220 is the same as the frequency set by operating system 222. The logical processor 212 can in this example delay the first interrupt for guest operating system 220 by 4 ms by storing an interrupt request in a queue that is scheduled to expire at time equals 10 ms and schedule subsequent interrupts to expire at system time equal to 20 ms and 30 ms for example. Thus, in this example embodiment a single timer interrupt can be used to service timer interrupts for a plurality of guest operating systems.

In certain embodiments the coalescer 226 instructions can include instructions that configure the logical processor 212 to keep track of how many interrupts have been delivered to the guest operating systems executing on virtual machines over time. As stated above, some interrupts can be delayed due to the tolerance of the guest operating systems however over time if too many are delayed the guest operating systems can be come unstable. Accordingly, in example embodiments of the present disclosure the coalescer 226 can enter a 'catch-up' mode such as is described by commonly owned U.S. patent application Ser. No. 11/197,614 entitled "Controlling virtual time" assigned to Microsoft Corporation and is incorporated by reference in its entirety. Generally speaking, in order to keep the pace of interrupts up over time the virtual machines and/or the coalescer 226 instructions can configure the logical processor 212 to enter a mode that configures the timer to generates interrupts at a faster than normal rate in order to supply these interrupts to the guest operating systems.

Continuing with the description of FIG. 6, operation 614 shows operation 404 wherein the operation further comprises determining, from the interrupt time interval, a system time that is a multiple of the interrupt time interval; and storing the interrupt request for the first virtual machine, the interrupt request associated with a next system time that is a multiple of the interrupt time interval. For example, in an embodiment of the present disclosure the determined interrupt time interval can be used to determine when to schedule at least the initial interrupt. For example, the coalescer instructions can be processed and the logical processor 212 can determine the next instance of system time that is a multiple of the interrupt time interval set by the guest operating system 218. The logical processor 212 can then store an interrupt request in a queue, e.g., RAM, that will expire at the next multiple of the interrupt time interval. In this example, the initial interrupt may be delayed, however subsequent intervals may be generated at the frequency set by the guest operating system 222. In a specific example, the guest operating system 222 may set a virtualized timer to generate interrupts at 15 ms intervals at system time equal to 5 ms, e.g., system clock could read 5,000,000 if clock is incrementing by nanoseconds. The logical processor 212 can process the instructions that effectuate the coalescer 226 and determine that the next system time value that is a multiple of 15 ms is system time equal to 15 ms. The logical processor 212 can then generate an interrupt request for the virtual machine 218 that is scheduled to expire at system time equal to 15,000,000 and in an alternative embodiment the logical processor 212 can additionally schedule a future interrupt for the virtual machine 218 to expire at system time 30,000,000, i.e., scheduling one or more additional periodic interrupts based on the interrupt frequency set by the guest operating system 222.

Figure 7:
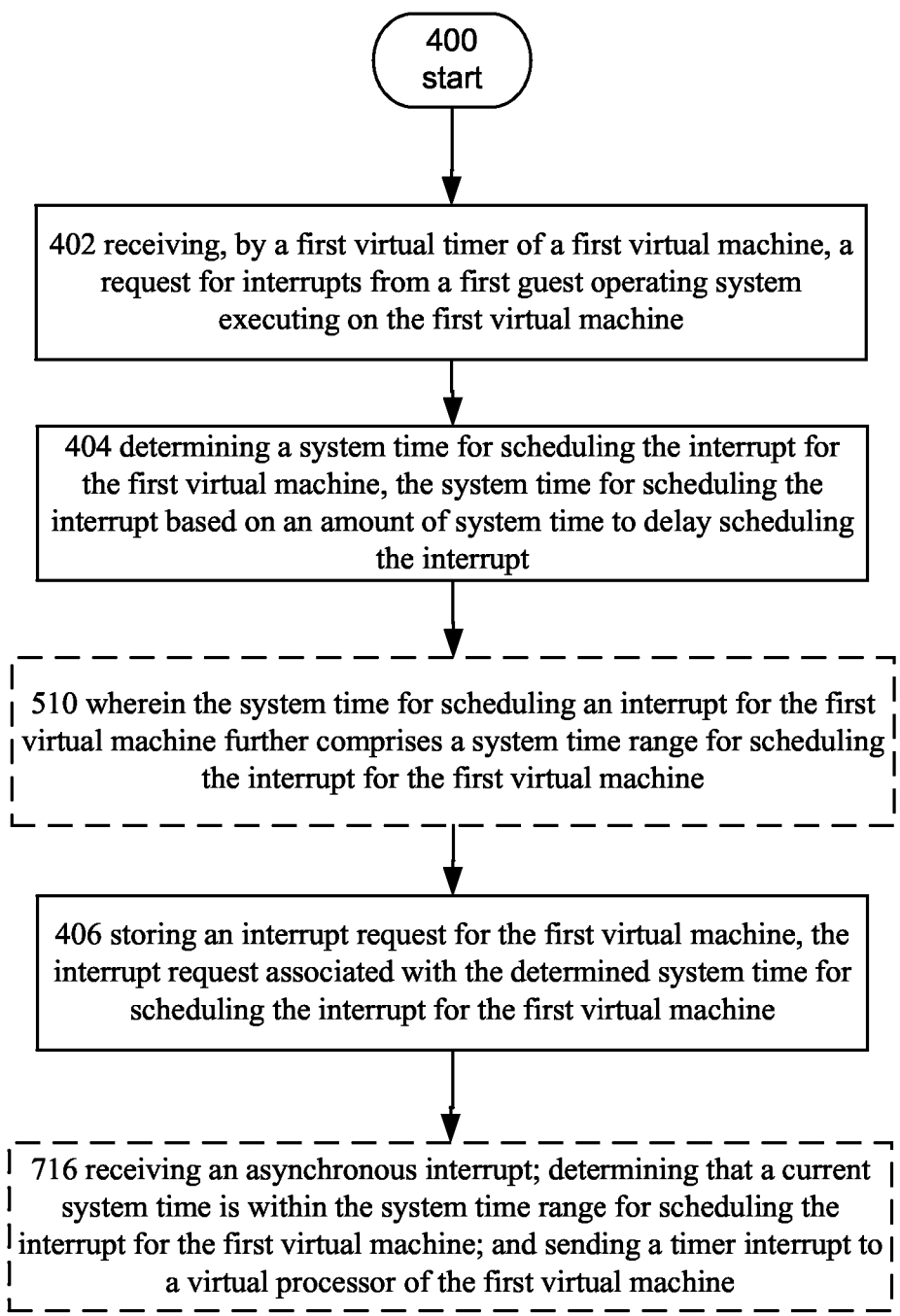
FIG. 7 illustrates an alternative embodiment of the operational procedure of FIG. 5.

Referring now to FIG. 7, it illustrates an alternative embodiment of the operational procedure of FIG. 5 showing additional operation 716 that shows receiving an asynchronous interrupt; determining that a current system time is within the system time range for scheduling the interrupt for the first virtual machine; and sending a timer interrupt to a virtual processor of the first virtual machine. In an example embodiment that includes operation 716, the logical processor 212 can be, for example, processing instructions that effectuate the root 204, the virtual machines 216 or 218, or any other instructions when an asynchronous interrupt, i.e., a signal that causes the logical processor 212 to save its state of execution and load an interrupt handler, is received. In this example the interrupt could have been set by, for example, the NIC, the hard drive, a video card, a plug and play device, a software interrupt, etc. In this example embodiment the interrupt can cause the logical processor 212 to execute the coalescer 226 and the current system time can be determined, e.g., a clock can be checked. The processor 212 in this example can determine the current system time is within the time range for one or more pending interrupt request and send a virtual timer interrupt to the virtual processor of virtual machine 218. In a specific example embodiment the logical processor 212 can be executing instructions that effectuate guest virtual machine 218 and in turn guest operating system 222 when an interrupt from a network interface card is received by the logical processor 212, e.g., the NIC 210 may have just received a confirmation signal that needs to be sent to guest operating system 220. In this example the logical processor 212 can execute instructions that are registered to handle this interrupt, e.g., the hypervisor 202 in an embodiment, and the coalescer 226 can be executed. The coalescer 226 can be configured to determine the next pending interrupt stored in the queue and check the range of system time values that are associated with the pending interrupt for virtual machine 218, e.g., [10:16] calculated in operation 510, and determine that the current system time is 14 ms. In this example the coalescer 226 can send a virtual processor interrupt to the virtual processor 232 of virtual machine 218. In an alternative embodiment the coalescer 226 can then be configured to clear the pending interrupt for the virtual machine in the timer; determine the next pending interrupt that needs to be serviced; and program the timer to expire at the end of the time range. After the coalescer 226 is executed by the logical processor 212 the hypervisor 202 can service the asynchronous interrupt by sending it to a virtual NIC of virtual machine 216 in order to have the interrupt be received by guest operating system 220.

In an example embodiment where the interrupt coalescer 226 is executed when an asynchronous interrupt occurs, e.g., the interrupt coalescer 226 is part of the hypervisor 202 and the hypervisor 202 is executed whenever an interrupt is received by the logical processor 212, the interrupt coalescer 226 can use that opportunity to generate virtual interrupts and send them to any partition that needs to have a periodic timer updated. This configuration allows for more efficient use of logical processor cycles because it reduces the number of times that the hypervisor 202 will be executed just to service periodic virtual interrupts. For example, when a logical processor 212 context switches, e.g., goes from executing guest operating system instructions 220 to executing, for example, instructions of the root partition 204, 2 to 3 thousand computer cycles will be wasted because of the overhead associated with saving the guest operating system state to RAM and loading the root 204 from RAM. Thus, it more desirable to reduce the number of times the logical processor 212 needs to change contexts by having the coalescer 226 use instances where the hypervisor 202 is already executing to generate virtual interrupts. That is, the hypervisor 202 instructions were going to be executed anyway in order to determine which virtual machine needs to receive the asynchronous interrupt so it is more efficient to use this opportunity to send virtual processor interrupts to virtual processors than to have to context switch back to the hypervisor 202 and send virtual processor interrupts.

Figure 8:
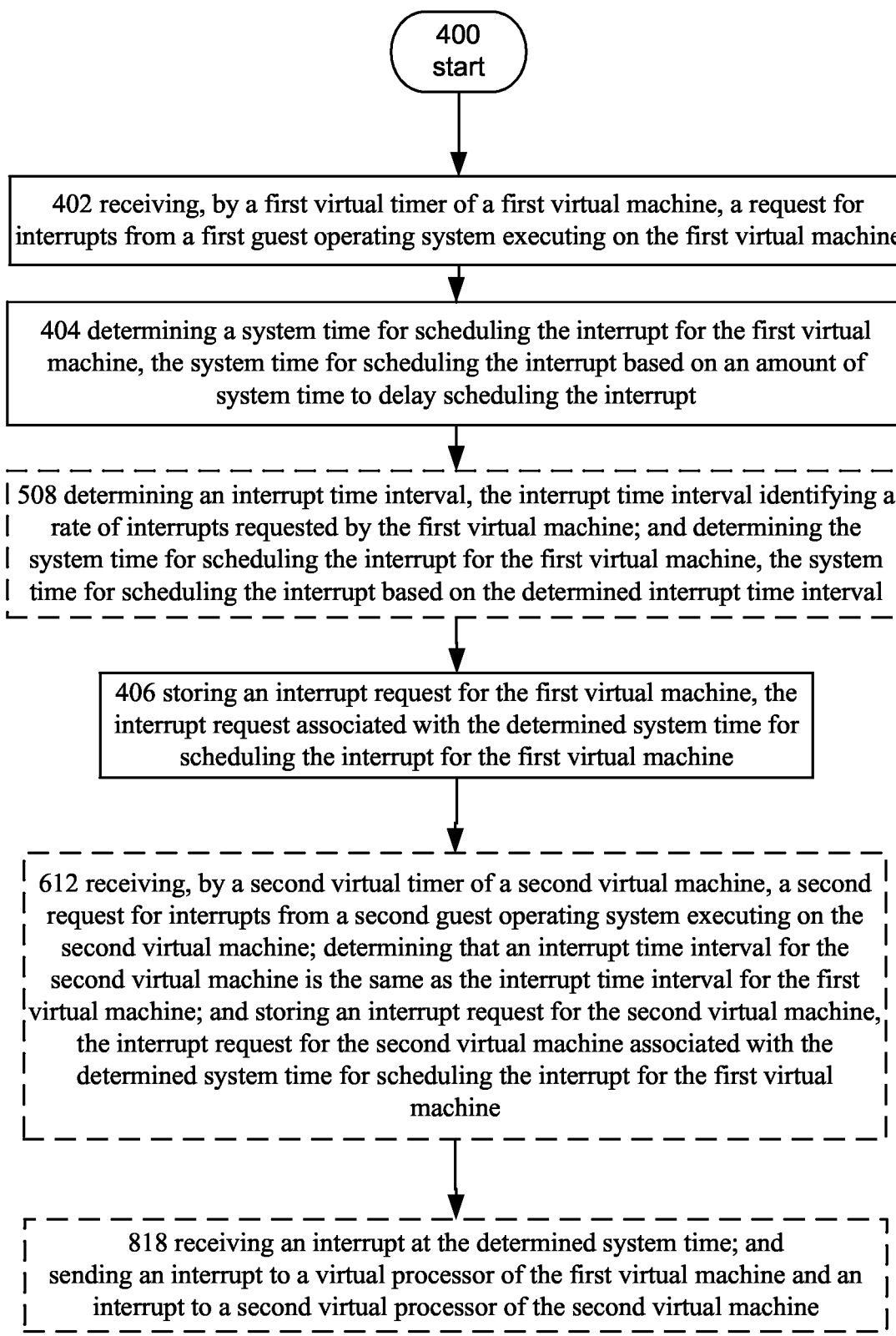
FIG. 8 illustrates an alternative embodiment of the operational procedure of FIG. 6.

Referring now to FIG. 8, it illustrates an alternative embodiment of the operational procedure of FIG. 6 showing additional operation 818 that shows receiving an interrupt at the determined system time; and sending an interrupt to a virtual processor of the first virtual machine and an interrupt to a second virtual processor of the second virtual machine. For example, in an embodiment of the present disclosure the timer can generate an interrupt and the logical processor 212 can switch executing whatever instructions it was executing and load the coalescer 226. The logical processor 212 can determine that the current system time is the same as the times associated with pending interrupt requests for the first and second virtual machines and the coalescer 226 can send a virtual processor interrupt to both virtual processors 230 and 232. In an embodiment the coalescer 226 can then be processed and the next system time for the next pending interrupt can be determined. The coalescer 226 can then set the registers of the timer to expire, e.g., generate an interrupt, at the system time needed to service the next pending interrupt in the coalescer 226 queue.

In a specific example, a system time may start at 0 and the timer may be programmed to expire at time equals 10 ms. At time equals 10 ms the timer can generate an interrupt and the processor can load the coalescer 226. The coalescer 226 can determine that a pending interrupt for virtual machine 216 and 218 are pending and the interrupts are associated with system time equal to 10. The coalescer 226 can send virtual processor interrupts to virtual processors 230 and 232 and then delete the pending interrupts from the queue. The coalescer 226 can then determine the next pending interrupt, e.g., interrupt for virtual machine 216 and 218 at time equals to 20 and the coalescer 226 can program timer to expire at time equals to 20.

Figure 9:
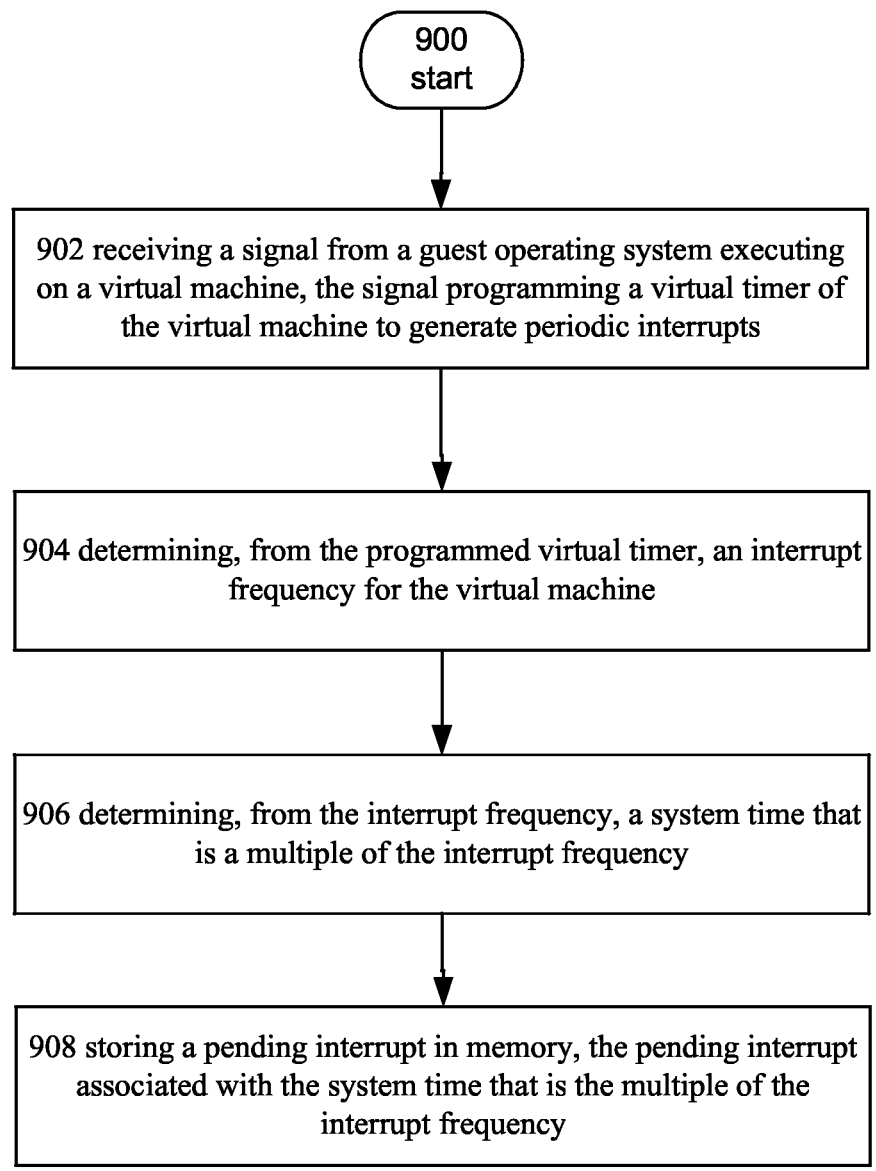
FIG. 9 illustrates an example operational procedure for practicing aspects of the present disclosure.

Referring now to FIG. 9 it illustrates an example operational procedure including operations 900, 902, 904, 906, and 908. Operation 900 begins the operational procedure and operation 902 illustrates receiving a signal from a guest operating system executing on a virtual machine, the signal programming a virtual timer of the virtual machine to generate periodic interrupts. Referring to FIG. 2 and FIG. 3, a virtual machine such as virtual machine 216 can include a virtual timer. A guest operating system such as guest operating system 220 can set a virtual timer, e.g., configure the virtual timer to provide a periodic interrupt. The virtual timer in this example can include a set of instructions that when executed by logical processor 212 emulate a physical timer such as an a real time clock (RTC) or any other hardware/software component that can provide a periodic interrupt source that can be found in a computer system. Guest operating system 220 can in this example set the virtualized registers of the timer in a manner that is indicative of programming the timer to provide a periodic interrupt. In another example embodiment the guest operating system 220 can be enlightened that is, the guest operating system is optimized for executing on a virtual machine. In this example the virtualized timer may not have virtual registers that can be set and may just include an interface that is operable to receive a signal indicative of a request for an interrupt and the request can be stored in memory.

Continuing with the description of FIG. 9, operation 904 shows determining, from the programmed virtual timer, an interrupt frequency for the virtual machine. For example, in an example embodiment a logical processor 212 can execute the coalescer 226 and can determine a frequency of interrupts from the configuration of the virtual timer of virtual machine 216. In an embodiment the logical processor 212 can execute the coalescer instructions 226 and can determine a frequency of interrupts that was set by the guest operating system 220. For example, the emulated RTC can include emulated registers that can be set by the guest operating system 220 to configure the virtual RTC to generate a periodic interrupt. In this example a guest operating system such as Windows Vista may set the registers of the RTC to generate 64 interrupts per second. The logical processor 212 in this example can execute the coalescer 226 and determine that the guest operating system is requesting an interrupt every 15.6 ms. In another example embodiment the guest operating system 220 may be enlightened and may send a signal indicative of a request for 64 interrupts per second to the virtual RTC and the coalescer 226 can be configured to determine that the guest operating system 220 is requesting an interrupt every 15.6 ms. In yet another embodiment the guest operating system may request an interrupt every 15.6 ms and the coalescer 226 can determine that the guest operating system is requesting an interrupt every 15.6 ms by accessing memory assigned to the virtual RTC.

Continuing with the description of FIG. 9, operation 906 shows determining, from the interrupt frequency, a system time that is a multiple of the interrupt frequency. Continuing with the description of FIG. 9, the interrupt frequency can be used by the processor 212 executing the instructions of the coalescer 226 to determine a system time for scheduling an interrupt to sent to virtual machine 216. The processor 212 may determine that the guest operating system 220 has set the virtual timer to generate interrupts every 10 ms from the way the virtual timer was configured. In this embodiment the processor 212 can determine the current system time and determine the next system time that is a multiple of the interrupt frequency. For example, if the current system time is 11,000,000, e.g., 11 in milliseconds, the processor 212 can calculate what system time will be a multiple of the determined frequency period by any variety of mathematical techniques and determine that the next system time that is a multiple of the frequency of interrupts is at system time equal to 20,000,000, e.g., 20 in milliseconds.

Continuing with the description of FIG. 9, operation 908 shows storing a pending interrupt in memory, the pending interrupt associated with the system time that is the multiple of the interrupt frequency. Once a time is determined for the interrupt, an interrupt request can be stored in a memory location along with the scheduled interrupt time, e.g., system time equal to 20 milliseconds continuing from the previous example. In one example the processor 212 can execute the coalescer 226 and program the timer to expire at system time equal to 20 ms. In another example, when, for example, the processor 212 executes the coalescer instructions 226 the processor 212 can check the current system time and determine whether any interrupt requests in memory need to be serviced. Similar to that described above, the coalescer 226 can be a part of the hypervisor 202 and the instructions that effectuate the hypervisor 202 can be registered to handle interrupts. That is, when the processor 212 enters hypervisor execution mode, e.g., whenever a hypercall is made, whenever a hypervisor interrupt occurs, whenever a hardware interrupt occurs from an asynchronous event, e.g., a read/write request is finished by a hard drive, and/or when a periodic timer such as the APIC expires, the coalescer instructions can be processed and the stored interrupt requests can be checked. In an alternative embodiment, one in which the coalescer 226 is part of a host operating system or stand alone instructions stored firmware, the instructions that effectuate the hypervisor 202 can be executed by the processor 212 when an interrupt occurs and the hypervisor 202 can direct the processor to execute the coalescer 226. The coalescer 226 instructions can be processed and the logical processor 212 can check the stored interrupt requests to determine whether any interrupt need to be serviced.

In an embodiment of the present disclosure the coalescer 226 can be executed and pending interrupts for a plurality of virtual machines can be stored in memory. In this example, the rate of interrupts can be calculated and the next system time that is a multiple of the frequency rate can be scheduled. If, for example, a plurality of virtual machines are executing guest operating systems that have the same frequency rate, the coalescer 226 can generate interrupt request that all have the same scheduled system time. In this instance one interrupt from the timer can be used to service a plurality of virtual machines. This in turn reduces the amount of interrupts that the logical processor 212 has to generate and may potentially allow the processor 212 to enter an operating mode that requires less power when there is no code that needs to be processed. In a specific example guest operating system 220 and 222 may set virtual timers at different system times, e.g., by starting up at different times, but may also set the same rate of interrupts, e.g., both may be operating systems that consume the same amount of interrupts per second. In this example guest operating system 220 may request an interrupt at system time equals to 13 in milliseconds and guest operating system 222 may request an interrupt at system time equals to 27 in milliseconds. The coalescer 226 in this example may schedule a pending interrupt for virtual machine 216 that expires at 20. At time equals to 20 the interrupt may expire and the coalescer 226 may schedule the next interrupt to expire at time equals to 30. At time equals to 27 guest operating system 222 may request an interrupt at system time and the coalescer 226 may schedule, based on the rate of interrupts associated with virtual machine 218, a pending interrupt for virtual machine 218 that expires at 30, thus in this example both virtual machines can have their pending interrupts serviced by one timer interrupt at system time equals to 30 ms.

Figure 10:
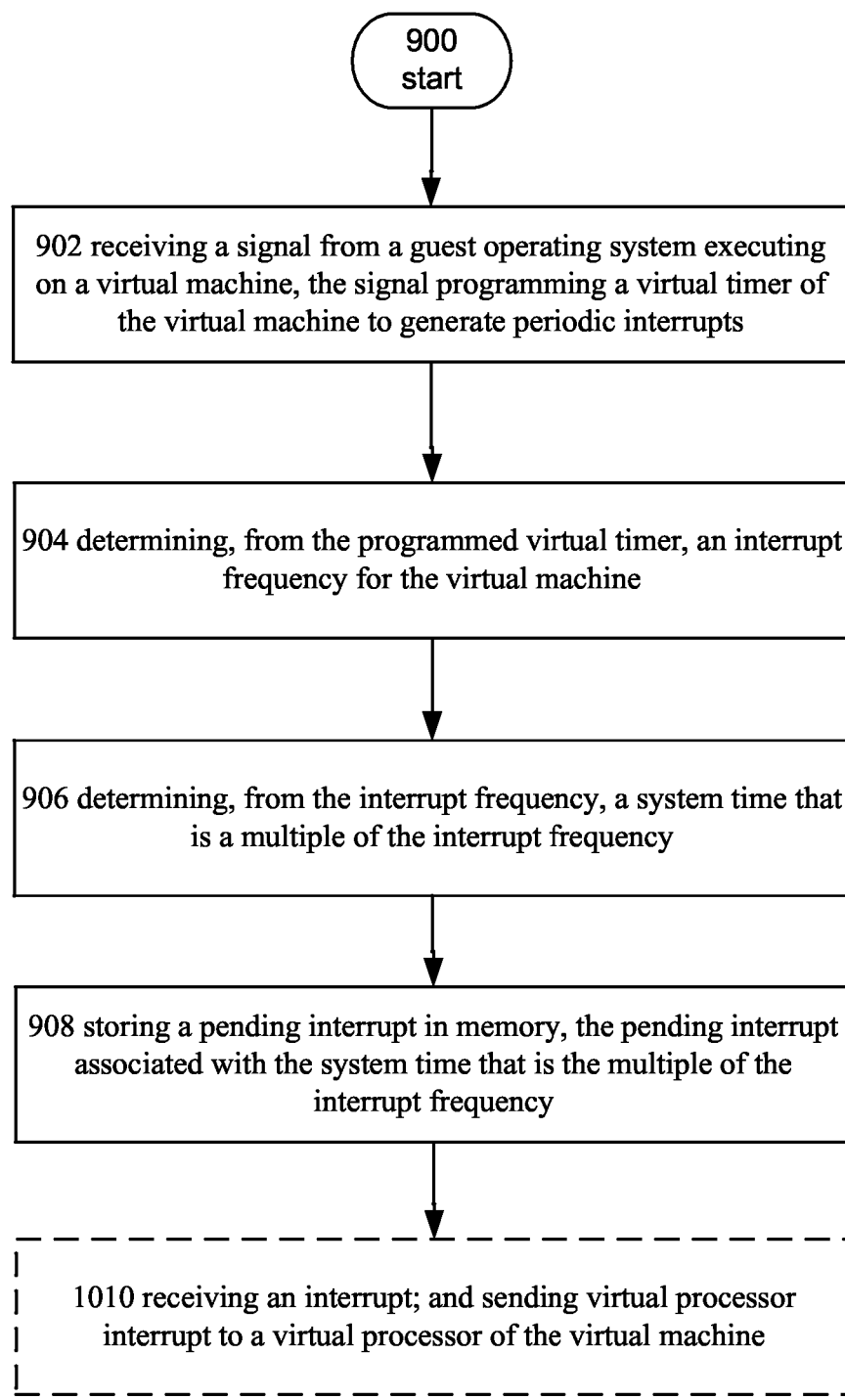
FIG. 10 illustrates an alternative embodiment of the operational procedure 900 of FIG. 9.

Referring now to FIG. 10, it illustrates an alternative embodiment of the operational procedure 900 of FIG. 9 including the additional operation 1010 that shows receiving an interrupt; and sending virtual processor interrupt to a virtual processor of the virtual machine. For example, in an embodiment of the present disclosure a timer, e.g., the RTC or any other hardware timer, can generate an interrupt and the logical processor 212 can switch executing whatever instructions it was executing, or exit an idle stage, and load the coalescer 226. The processor 212 can determine that the current system time is the same as the times associated with a pending interrupt request for virtual machine 216 and the coalescer 226 can send a virtual processor interrupt to the virtual processor 230 of virtual machine 216. In an embodiment the coalescer 226 can then be processed and the next system time for the next pending interrupt can be determined. The coalescer 226 can then set the registers of the timer to expire, e.g., generate an interrupt, at the system time needed to service the next pending interrupt in the coalescer queue.

Figure 11:
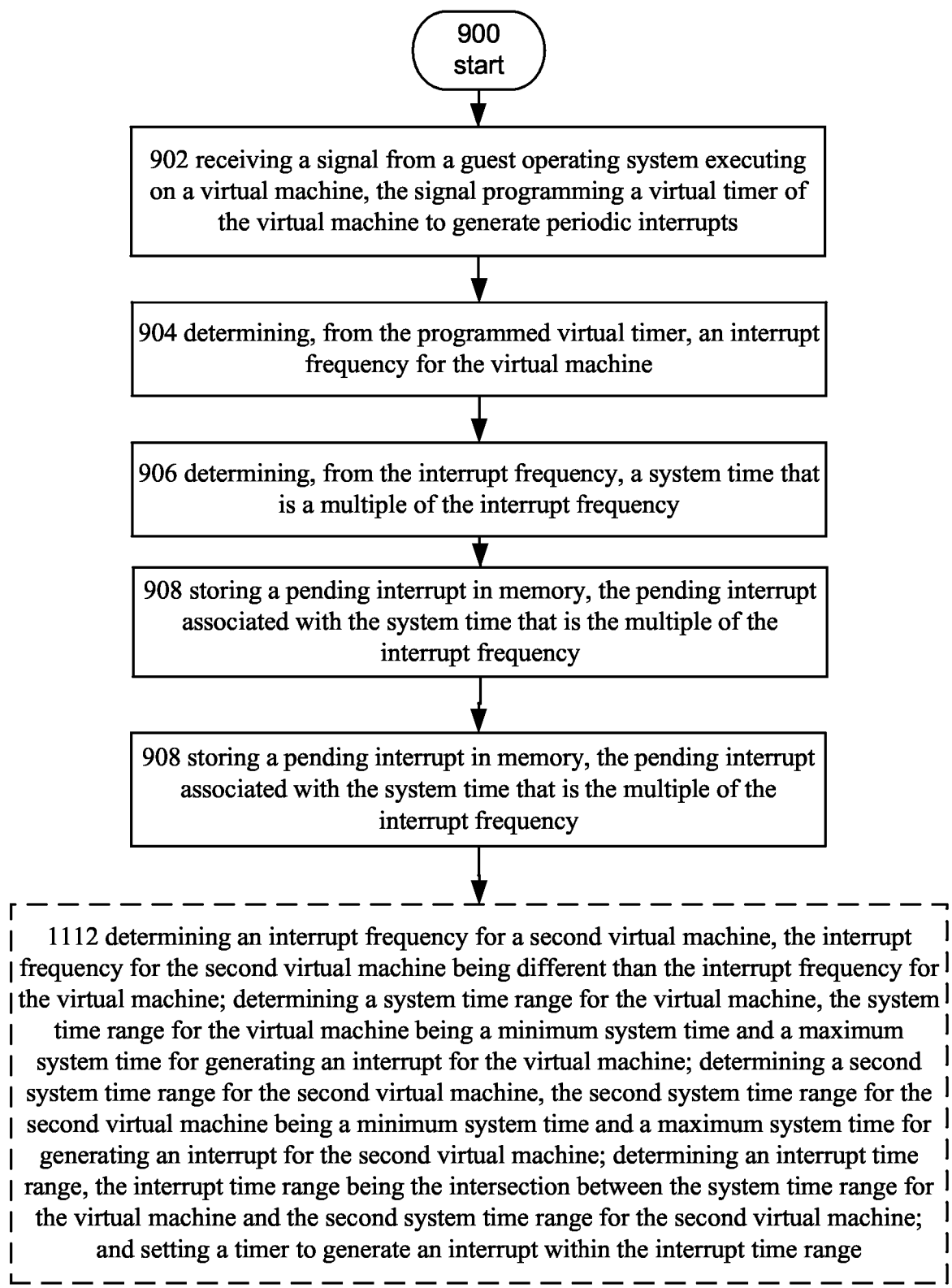
FIG. 11 illustrates an alternative embodiment of the operational procedure 900 of FIG. 9.

Referring now to FIG. 11, it illustrates an alternative embodiment of the operational procedure 900 of FIG. 9 including the additional operation 1112 that shows determining an interrupt frequency for a second virtual machine, the interrupt frequency for the second virtual machine being different than the interrupt frequency for the virtual machine; determining a system time range for the virtual machine, the system time range for the virtual machine being a minimum system time and a maximum system time for generating an interrupt for the virtual machine; determining a second system time range for the second virtual machine, the second system time range for the second virtual machine being a minimum system time and a maximum system time for generating an interrupt for the second virtual machine; determining an interrupt time range, the interrupt time range being the intersection between the system time range for the virtual machine and the second system time range for the second virtual machine; and setting a timer to generate an interrupt within the interrupt time range. In an example embodiment a timer such as an RTC can be configured to generate an interrupt within the interrupt time range. In this example a guest operating system such as guest operating system 222 may have a different interrupt frequency than guest operating system 220 and other techniques can be used to reduce the amount of timer interrupts generated by the processor. For example, guest operating system 220 may have an interrupt frequency of 10 ms whereas guest operating system 222 may have an interrupt frequency of 15 ms. In this example while it may be difficult to find a single system time for sending both interrupts that takes into account the tolerances of both guest operating systems, a range of system time values may be calculated so that if an interrupt occurs during the range, the coalescer 226 can use the interrupt to generate virtual processor interrupts for both the virtual processors 230 and 232 of both virtual machines 216 and 218. Accordingly, in this example embodiment an the intersection of the ranges of time where the tolerances of both virtual machines can be used to generate a single interrupt to service both virtual machines.

In a specific example the tolerance of virtual machine 216 can be calculated and the tolerance of virtual machine 218 can be calculated. The logical processor 212 can execute the coalescer 226 and determine that the range for virtual machine 216 is the system time in between interrupts, that is, if the interrupt frequency is 10 ms, and next interrupt is going to be generated at system time equal to 10 ms the system time range for the virtual machine 216 would be [10:20]. Similarly, if the second virtual machine has an interrupt frequency of 15 ms and the next interrupt is going to be generated at system time equal to 15 ms the system time range for the virtual machine 218 would be [15:30]. In this specific example, the coalescer 226 can be executed and the processor 212 can determine that the intersection is between [15:20]. The coalescer 226 can be executed and the processor 212 can set a timer such as the RTC to expire within the intersection, e.g., at any system time between, and including, 15 and 20 in this example.

Figure 12:
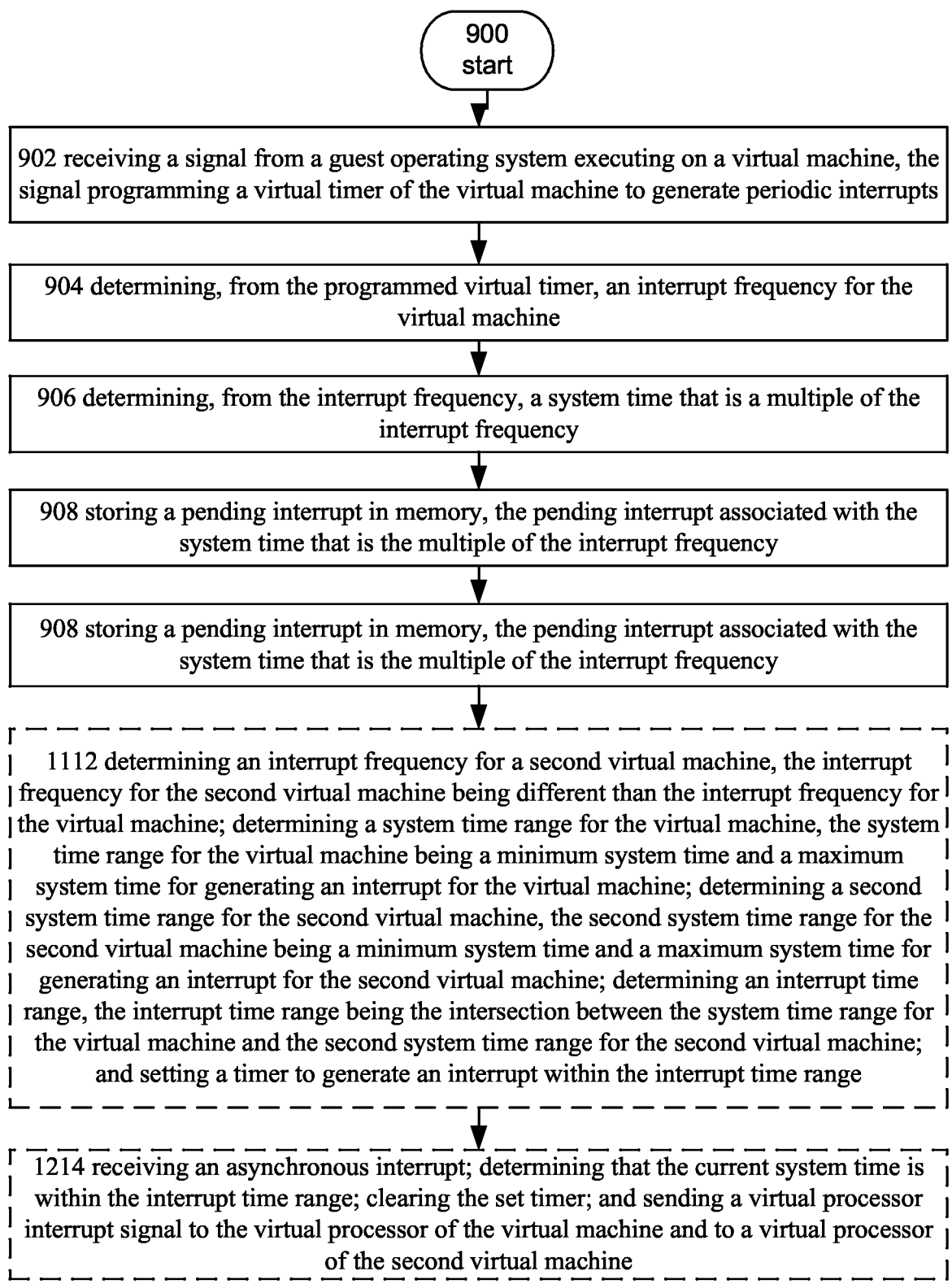
FIG. 12 illustrates an alternative embodiment of the operational procedure 900 of FIG. 11

Referring now to FIG. 12, it illustrates an alternative embodiment of the operational procedure 900 of FIG. 11 including the additional operation 1214 that shows receiving an asynchronous interrupt; determining that the current system time is within the interrupt time range; clearing the set timer; and sending a virtual processor interrupt signal to the virtual processor of the virtual machine and to a virtual processor of the second virtual machine. In an example embodiment, the logical processor 212 can be, for example, executing within a virtual machine or any other instructions when an asynchronous interrupt is received. In this example embodiment the interrupt can cause the logical processor 212 to execute the coalescer 226 and the current system time can be determined, e.g., a clock can be checked. The processor 212 in this example can determine the current system time is within the interrupt time range, e.g., system time equal to 12 where the range is [10:15] as was calculated in operating 1111, and send a virtual timer interrupt to the virtual processor of virtual machine 218. In this example the processor 212 can be configured to additionally clear the timer so that the timer does not generate another interrupt for this interrupt range. Alternatively, or additionally, the logical processor 212 can set the timer to expire within the next interrupt range, e.g., at system time [30:30] since the next window for generating an interrupt for virtual machine 216 would be from 20 ms to 30 ms and the next window for generating an interrupt for virtual machine 218 would be from [30:45] thereby making the intersection [30:30]. If, for example, there is a situation where there is no intersection the coalescer 226 can program the timer to expire within the range for a single virtual machine or the coalescer 226 can program the timer to expire at the next multiple of the interrupt frequency for the single virtual machine.

Similar to that described above, when the interrupt coalescer 226 is part of a hypervisor 202, the hypervisor 202 can use the opportunity to run the interrupt coalescer instructions and send virtual processor interrupts to any partition that can be serviced at the current system time. This configuration allows for more efficient use of logical processor cycles because it reduces the number of times that the hypervisor 202 will be executed just to service periodic virtual interrupts. That is, since the hypervisor 202 instructions are executed to determine how to handle the asynchronous interrupt, the coalescer routine can be run to determine which virtual machine needs to receive the asynchronous interrupt. This increases efficiency because it reduces context switches which are costly in terms of computer cycles. For example, when a logical processor 212 context switches, e.g., goes from executing guest operating system instructions 220 to executing, for example, instructions of the root partition 204, 2 to 3 thousand computer cycles will be wasted because of the overhead associated with saving the guest operating system state to RAM and loading the root 204 from RAM. Thus, it more desirable to reduce the number of times the logical processor 212 needs to change contexts by having the coalescer 226 use instances where the hypervisor 202 is already executing to generate virtual interrupts.

Figure 13:
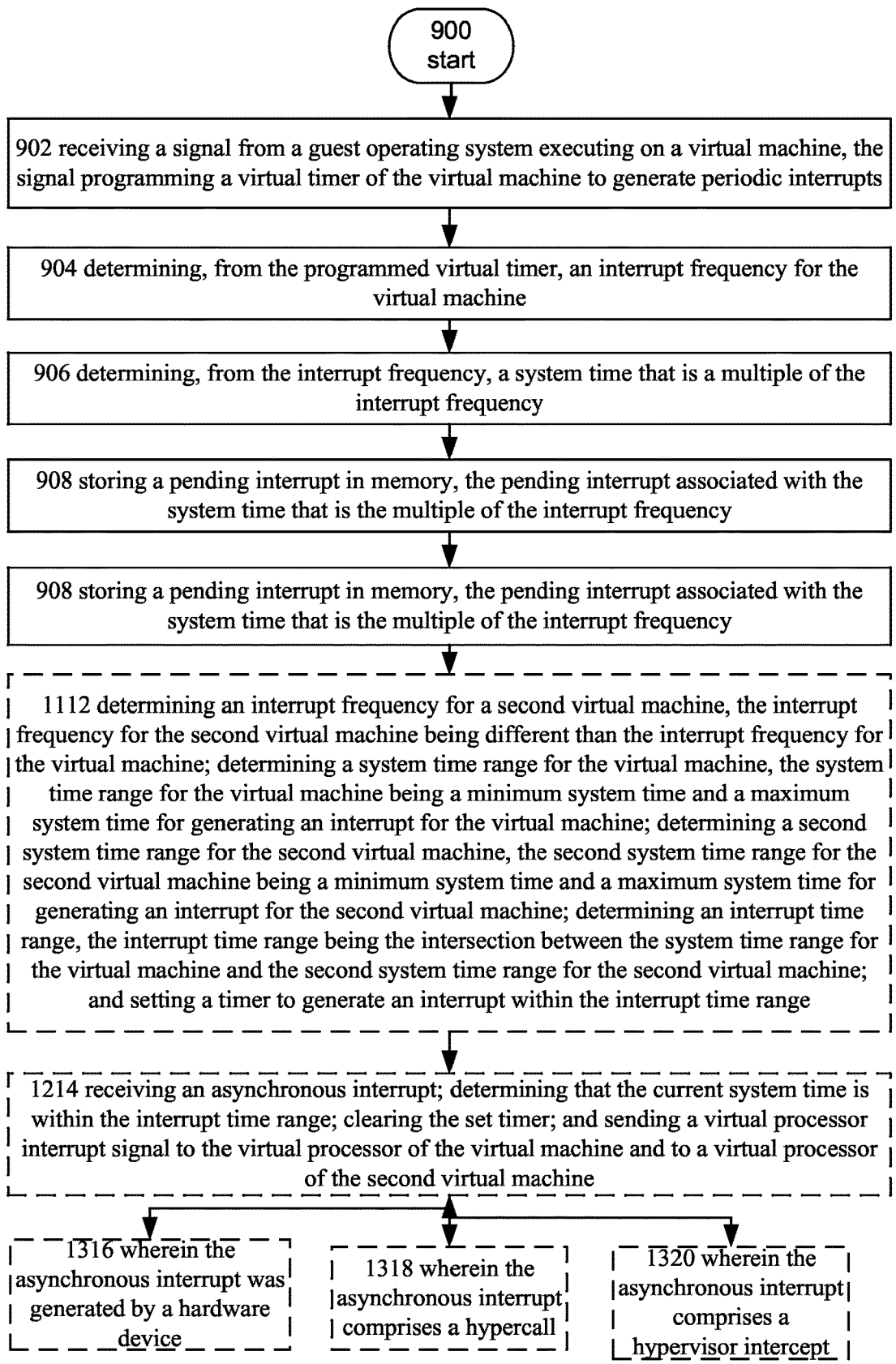
FIG. 13 illustrates an alternative embodiment of the operational procedure 900 of FIG. 12.

Referring now to FIG. 13, it illustrates an alternative embodiment of the operational procedure 900 of FIG. 12 including the additional operations 1316, 1318, and 1320. Operation 1316 illustrates receiving the asynchronous interrupt, wherein the asynchronous interrupt was generated by a hardware device. For example, in an embodiment the asynchronous interrupt can be received from a hardware device such as, but not limited to the NIC, the hard drive, a video card, a plug and play device, a sound card, or any other physical component of or attached to the computer system 200.

Continuing with the description of FIG. 13, operation 1318 illustrates receiving the asynchronous interrupt, wherein the asynchronous interrupt comprises a hypercall. In embodiments of the present disclosure the asynchronous interrupt can be a hypercall, e.g., a software request made to the hypervisor from a guest operating system for the hypervisor 202 to provide information or to take some sort of action. In example embodiments this could include requesting processor activity, inter-partition messaging, requests by the root to create or delete partitions, etc. In this example the hypercall can place the logical processor into hypervisor execution mode and the coalescer 226 can be executed to determine whether to send virtual processor interrupts to any virtual machines.

Continuing with the description of FIG. 13, operation 1320 illustrates receiving the asynchronous interrupt, wherein the asynchronous interrupt comprises a hypervisor intercept. In embodiments of the present disclosure the asynchronous interrupt can be a hypervisor intercept, i.e., a virtual processor may trigger an event that causes an intercept such as by trying to access an I/O port, or triggering an exception, profiling, monitoring, and page sharing (copy-on-write). In this case the hypervisor 202 may be executed by the logical processor 212 and the coalescer 226 can be executed to determine whether to send virtual processor interrupts to any virtual machines. After the coalescer 226 is executed the hypervisor 202 service the intercept by sending a signal to the root to resolve the issue and resume executing the virtual processor.

Figure 14:
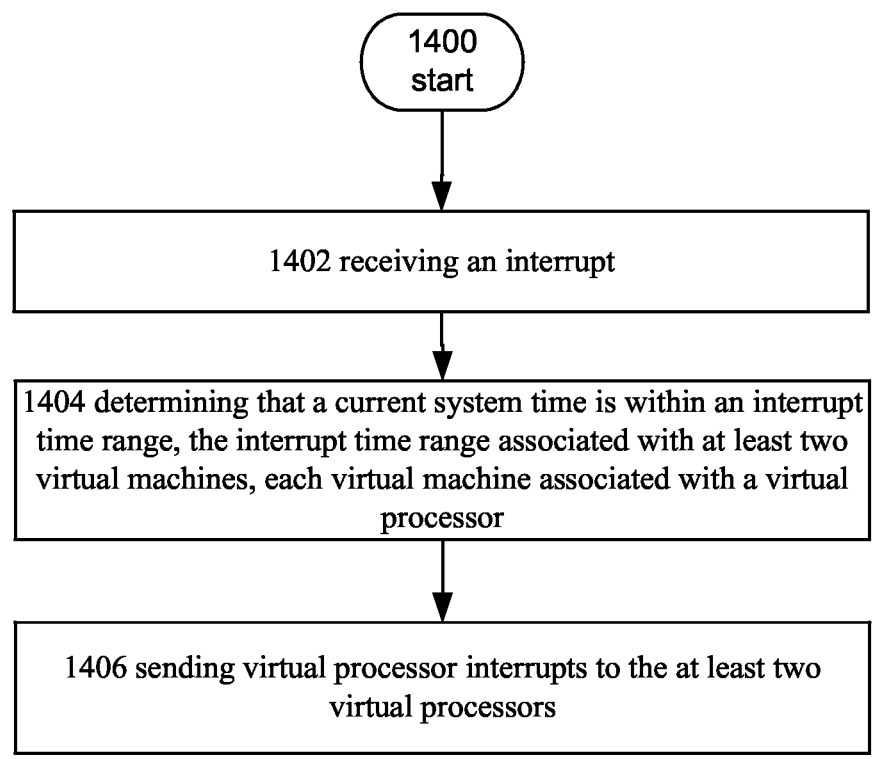
FIG. 14 illustrates an example operational procedure for coalescing interrupts.

Referring now to FIG. 14, it illustrates example operational procedures for coalescing interrupts including operations 1400, 1402, 1404, and 1406. Referring to operation 1400 it begins the operational procedure and operation 1402 shows receiving an interrupt. For example, in an embodiment a logical processor 212 can receive an interrupt. The logical processor 212 can be idle, e.g., in a low power mode, or it can be executing instructions that effectuate the root 204, a guest operating system such as guest operating system 220, the hypervisor 202, or any other instructions when an interrupt is received.

Continuing with the description of FIG. 14, operation 1404 shows determining that a current system time is within an interrupt time range, the interrupt time range associated with at least two virtual machines, each virtual machine associated with a virtual processor. Once the interrupt is received the logical processor 212 can load the coalescer 226. That is, in one embodiment the hypervisor 202 can be executed and the coalescer 226 can be a part of the hypervisor 202, or in another embodiment the hypervisor 202 can be executed and can in turn cause the processor 212 to execute the coalescer 226 that is a part of the root 204 or stored in firmware on the motherboard. The processor 212 can execute the coalescer 226 and check the current system time and determine whether the current system time is within any interrupt time ranges for pending interrupts. In this example embodiment the logical processor 212 can determine that periodic virtual timers for at least two virtual machines such as virtual machines 216 and 218 can be expired with a signal interrupt.

Continuing with the description of FIG. 14, operation 1406 shows sending virtual processor interrupts to the at least two virtual processors. Continuing with the description of FIG. 14, the processor 212 can be configured to send virtual processor interrupt signals to the two or more virtual processors such as for virtual processors 230 and 232. The virtual processors 230 and 232 can be run and the guest operating systems 220 and 220 can use the interrupt for internal bookkeeping purposes such as those described above.

Figure 15:
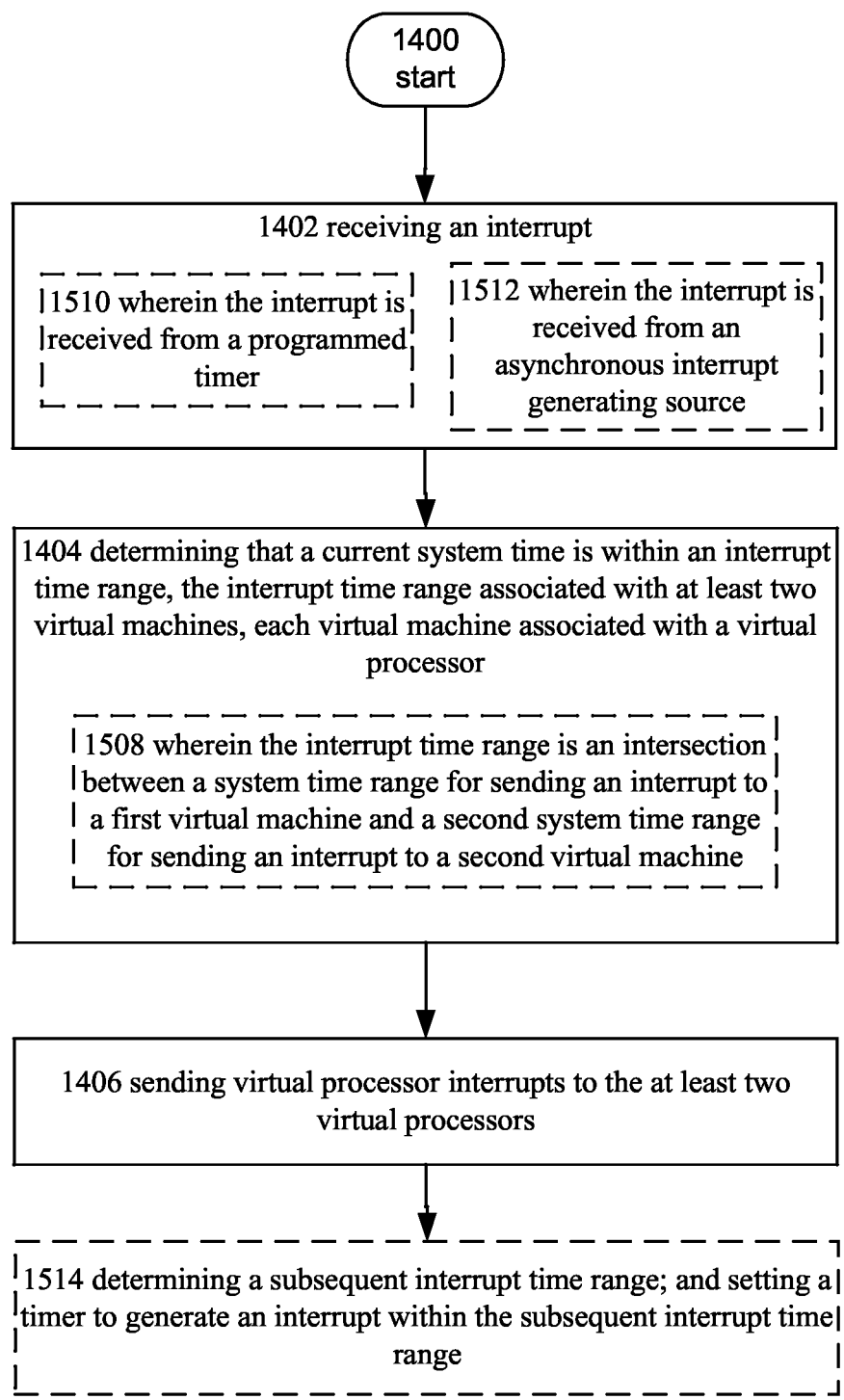
FIG. 15 illustrates an alternative embodiment of the operational procedure of FIG. 14.

Referring now to FIG. 15, it illustrates an alternative embodiment of the operational procedure of FIG. 14 including the additional operations 1508, 1510, 1510, and 1512. Referring to operation 1508 it illustrates the operational procedure of FIG. 14, wherein the interrupt time range is an intersection between a system time range for sending an interrupt to a first virtual machine and a second system time range for sending an interrupt to a second virtual machine. For example, in an embodiment the interrupt time range can be determined from the intersection between different a system time ranges for at least two virtual machines. In this example a guest operating system such as guest operating system 222 may have a different interrupt frequency than guest operating system 220, or in other embodiments the interrupt frequency range may entirely overlap, e.g., both operating systems may have the same interrupt frequency. The coalescer 226 in this example can use the interrupt to generate virtual processor interrupts for both the virtual processors of both virtual machines. Accordingly, in this example embodiment an the intersection of the ranges of time where the tolerances of both virtual machines can be used to generate a single interrupt to service both virtual machines.

In a specific example the tolerance of virtual machine 216 can be calculated and the tolerance of virtual machine 218 can be calculated. The logical processor 212 can execute the coalescer 226 and determine that the range for virtual machine 216 is the system time in between interrupts. That is, if at system time 0 the interrupt frequency is 8 ms for a first virtual machine the next interrupt is going to be generated at system time equal to 8 ms the system time range for the virtual machine would be [8:16]. Similarly, if a second virtual machine has an interrupt frequency of 15 ms the system time range for the virtual machine would be [15:30]. In this specific example, the coalescer 226 can be executed and the processor 212 can determine that the intersection is between [15:16]. The coalescer 226 can be executed and the processor 212 can set a timer such as the RTC to expire within the intersection, e.g., either system time equal to 15 or 16 in this example.

Continuing with the description of FIG. 15, operation 1510 shows the operational procedure of FIG. 14, wherein the interrupt is received from a programmed timer. For example, in an embodiment the interrupt can be received from a programmed timer such as the RTC. The logical processor 212 may have earlier programmed the time to expire in order to generate virtual processor interrupts for the at least two virtual processors such as virtual processors 230 and 232.

Continuing with the description of FIG. 15, operation 1512 shows the operational procedure of FIG. 14, wherein the interrupt is received from an asynchronous interrupt generating source. In an example embodiment the logical processor 212 can be, for example, idle, processing instructions that effectuate the root, the virtual machines 216 or 218, or any other instructions when an asynchronous interrupt, i.e., a signal that causes the logical processor to save its state of execution and load an interrupt handler, is received. In this example the interrupt could have been set by, for example, the NIC, the hard drive, a video card, a plug and play device, a software interrupt, etc. In this example embodiment the interrupt can cause the logical processor 212 to execute the coalescer 226 and the current system time can be determined, e.g., a clock can be checked. The processor 212 in this example can determine the current system time is within the time range for one or more pending interrupt request and send a virtual timer interrupt to the virtual processor of virtual machine 218.

Continuing with the description of FIG. 15, operation 1514 shows determining a subsequent interrupt time range; and setting a timer to generate an interrupt within the subsequent interrupt time range. For example, in this example the coalescer 226 can send virtual interrupts to virtual processors 230 and 232 of the virtual machines 216 and 218 and calculate a time range for scheduling the next interrupt. Once the next time range is calculated the coalescer 226 can set the registers of the timer to generate an interrupt at a time within the next time range. In an embodiment the next time range can be calculated using techniques described above with respect to operations 512, and/or 1112.

Figure 16:
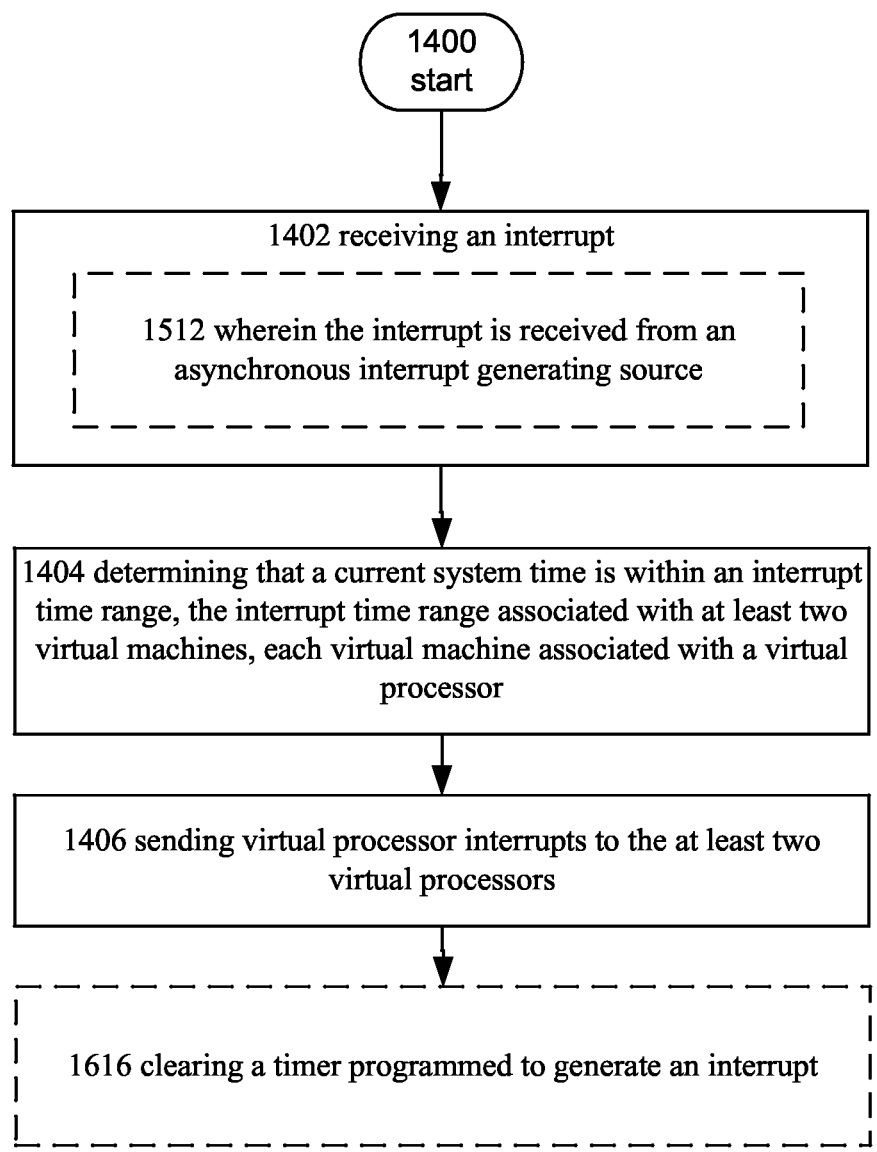
FIG. 16 depicts an alternative embodiment of the operational procedure of FIG. 15.

Referring now to FIG. 16 it depicts an alternative embodiment of the operational procedure of FIG. 15 including the additional operation 1616 that shows clearing a timer programmed to generate an interrupt. For example, in the instance that an asynchronous interrupt is used to generate virtual processor interrupts, the timer can be cleared since an interrupt for this time range is no longer needed.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A method for coalescing interrupts, comprising:
receiving, by a first virtual timer of a first virtual machine, a request for periodic interrupts at a first interval from a first guest operating system executing on the first virtual machine;
receiving, by a second virtual timer of a second virtual machine, a request for periodic interrupts at a second interval from a second guest operating system executing on the second virtual machine;
determining, based on the first interval, a first system time range for the first virtual machine, the first system time range comprising a minimum system time and a maximum system time for generating a periodic interrupt for the first virtual machine within a tolerance of the first guest operating system;
determining, based on the second interval, a second system time range for the second virtual machine, the second system time range comprising a minimum system time and a maximum system time for generating a periodic interrupt for the second virtual machine within a tolerance of the second guest operating system
determining an interrupt time range, the interrupt time range being the intersection between the first system time range and the second system time range, and setting a hardware timer to expire at first system time within the interrupt time range; and
sending, in response to the hardware timer expiring at the first system time, a virtual timer interrupt to each of the first virtual machine and the second virtual machine.

2. The method of claim 1, further comprising:
receiving an asynchronous interrupt prior to the first system time;
determining whether a current system time is within the interrupt time range in response to receiving the asynchronous interrupt; and
sending a virtual timer interrupt to each of the first virtual machine and the second virtual machine in response to determining the current system time is within the interrupt time range.

3. The method of claim 2, wherein the method further comprises:
clearing the set timer in response to sending the virtual timer interrupts.

4. The method of claim 2, wherein the asynchronous interrupt was generated by a hardware device.

5. The method of claim 1, wherein the first interval is different form the second interval.

6. The method of claim 5, wherein determining the first system time range further comprises:
determining a second system time that is a multiple of the first interval, wherein the second system time is within the first system time range.

7. The method of claim 6, wherein determining the second system time further comprises:
determining a third system time that is a multiple of the second interval, wherein the third system time that is within the second system time range.

8. A system for coalescing interrupts comprising:
circuitry configured to receive a signal from a first guest operating system executing on a first virtual machine, the signal programming a virtual timer of the first virtual machine to generate periodic interrupts at a first interval;
circuitry configured to receive a second signal from a second guest operating system executing on a second virtual machine, the second signal programming a virtual timer of the second virtual machine to generate periodic interrupts at a second interval;
circuitry configured to determine based on the first interval, a first system time range for the first virtual machine, the first system time range comprising a minimum system time and a maximum system time for generating a periodic interrupt for the first virtual machine within a tolerance of the first guest operating system;
circuitry configured to determine, based on the second interval, a second system time range for the second virtual machine, the second system time range comprising a minimum system time and a maximum system time for generating a periodic interrupt for the second virtual machine within a tolerance of the second guest operating system
circuitry configured to determine an interrupt time range, the interrupt time range being the intersection between the first system time range and the second system time range, and set a hardware timer to expire at a first system time within the interrupt time range; and circuitry configured to send, in response to the hardware timer expiring at the first system time, a virtual timer interrupt to each of the first virtual machine and the second virtual machine.

9. The system of claim 8, further comprising:

circuitry configured to receive an asynchronous interrupt prior to the first system time;

circuitry configured to determine whether a current system time is within the interrupt time range in response to receiving the asynchronous interrupt; and circuitry configured to send a virtual timer interrupt to each of the first virtual machine and the second virtual machine in response to determining the current system time is within the interrupt time range.

10. The system of claim 9, further comprising:

circuitry configured to clear the set timer in response to sending the virtual timer interrupts.

11. The system of claim 9, wherein the asynchronous interrupt was generated by a hardware device.

12. The system of claim 9, wherein the asynchronous interrupt comprises a hypercall.

13. The system of claim 9, wherein the asynchronous interrupt comprises a hypervisor intercept.

14. A computer readable hardware storage device including computer executable instructions for coalescing interrupts, the computer readable hardware storage device comprising:

instructions for receiving, by a first virtual timer of a first virtual machine, a request for a periodic interrupts at a first interval from a first guest operating system executing on the first virtual machine;

instructions for receiving, by a second virtual timer of a second virtual machine, a request for a periodic interrupts at a second interval from a second guest operating system executing on the second virtual machine;

instructions for determining, based on the first interval, a first system time range for the first virtual machine, the first system time range comprising a minimum system time and a maximum system time for generating a periodic interrupt for the first virtual machine within a tolerance of the first guest operating system;

instructions for determining based on the second interval a second system time range for the second virtual machine, the second system time range comprising a minimum system time and a maximum system time for generating a periodic interrupt for the second virtual machine within a tolerance of the second guest operating system; and instructions for determining an interrupt time range, the interrupt time range being the intersection between the first system time range and the second system time range, and setting a hardware timer to expire at a first system time within the interrupt time range; and sending, in response to the hardware timer expiring at the first system time, a virtual timer interrupt to each of the first virtual machine and the second virtual machine.

15. The computer readable storage device of claim 14, further comprising:

instructions for receiving an asynchronous interrupt prior to the first system time;

instructions for determining whether a current system time is within the interrupt time range in response to receiving the asynchronous interrupt; and instructions for sending a virtual timer interrupt to each of the first virtual machine and the second virtual machine in response to determining the current system time is within the interrupt time range.

16. The computer readable storage device of claim 15, further comprising:

instructions for clearing the set timer in response to sending the virtual timer interrupts.

17. The computer readable storage device of claim 14, wherein the asynchronous interrupt is received from a programmed timer.

18. The computer readable storage device of claim 14, wherein the asynchronous interrupt is received from a hardware device.

* * * * *